(12) United States Patent
Egan

(10) Patent No.: US 7,193,640 B2
(45) Date of Patent: Mar. 20, 2007

(54) PRINTER COLOR REGISTRATION CORRECTION

(75) Inventor: Richard G. Egan, Dover, MA (US)

(73) Assignee: Polaroid Corporation, Waltham, MA (US)

(*) Notice: Subject to any disclaimer, the term of this patent is extended or adjusted under 35 U.S.C. 154(b) by 489 days.

(21) Appl. No.: 10/698,209

(22) Filed: Oct. 31, 2003

(65) Prior Publication Data
US 2005/0093956 A1 May 5, 2005

(51) Int. Cl.
*B41J 2/315* (2006.01)

(52) U.S. Cl. ..................... 347/171
(58) Field of Classification Search ........... 347/171, 347/188, 190, 191, 116, 19; 399/301, 320
See application file for complete search history.

(56) References Cited

U.S. PATENT DOCUMENTS

| | | | |
|---|---|---|---|
| 4,553,164 A | 11/1985 | Labb | 358/163 |
| 4,916,547 A | 4/1990 | Katsumata et al. | 358/300 |
| 5,076,163 A | 12/1991 | Sainio | 101/181 |
| 5,384,592 A | 1/1995 | Wong | 346/157 |
| 5,452,073 A | 9/1995 | Kataoka | 355/271 |
| 5,457,518 A | 10/1995 | Ashikaga et al. | 355/208 |
| 5,550,625 A | 8/1996 | Takamatsu et al. | 355/326 R |
| 5,768,671 A | 6/1998 | Komiya et al. | 399/301 |
| 5,778,280 A | 7/1998 | Komiya et al. | 399/49 |
| 5,867,759 A | 2/1999 | Isobe et al. | 399/301 |
| 5,887,125 A | 3/1999 | Takano et al. | 395/111 |
| 6,106,094 A | 8/2000 | Otani et al. | 347/19 |
| 6,118,463 A | 9/2000 | Houki et al. | 347/116 |
| 6,185,402 B1 | 2/2001 | Linssen | 399/301 |
| 6,198,896 B1 | 3/2001 | Nakayasu et al. | 399/301 |
| 6,324,375 B1 | 11/2001 | Hada et al. | 399/301 |
| 6,327,453 B1 | 12/2001 | Imaizumi et al. | 399/301 |
| 6,456,311 B1 | 9/2002 | Harush et al. | 347/116 |
| 6,529,616 B1 | 3/2003 | Rasmussen et al. | 382/112 |
| 6,573,919 B2 | 6/2003 | Benear et al. | 347/116 |
| 2002/0043164 A1 | 4/2002 | Kajiwara et al. | 101/171 |

FOREIGN PATENT DOCUMENTS

| | | |
|---|---|---|
| EP | 0 077 239 | 5/1985 |
| EP | 0 629 082 A1 | 5/1994 |
| EP | 0 720 350 A2 | 7/1996 |
| EP | 0 720 350 A3 | 7/1996 |
| EP | 0 629 082 B1 | 2/1999 |
| EP | 0 998 128 A2 | 10/1999 |
| EP | 1 009 157 A2 | 6/2000 |
| EP | 0 744 669 B1 | 8/2002 |

(Continued)

*Primary Examiner*—K. Feggins

(57) ABSTRACT

Techniques are disclosed for performing color registration estimation and correction in a multi-head printer. A registration target is printed by the printer and captured by an image capture device (such as a camera) within the printer. The registration target includes a plurality of shapes, each of which is printed by a single one of the print heads in the printer, and which are arranged in a pattern designed to enable cross-web and down-web registration estimates to be generated. The printer analyzes the captured target to generate such cross-web and down-web registration estimates and thereby to generate cross-web and down-web registration corrections. The printer applies the registration corrections to subsequent print jobs, thereby reducing or eliminating misregistration in printed output. The techniques disclosed herein are suitable for use in printers having print heads that differ in resolution from each other.

25 Claims, 14 Drawing Sheets

FOREIGN PATENT DOCUMENTS

| | | |
|---|---|---|
| JP | 62-97846 | 5/1987 |
| JP | 62097846 A | 5/1987 |
| JP | 2000-158717 | 10/1999 |
| JP | 2000158717 A | 10/1999 |
| WO | 99/01286 | 1/1999 |

PRINTER COLOR REGISTRATION CORRECTION

CROSS REFERENCE TO RELATED APPLICATIONS

This application is related to the following commonly-owned U.S. Patent Applications, all of which are hereby incorporated by reference herein:

U.S. patent application Ser. No. 10/080,883, filed on Feb. 22, 2002, entitled "A High-Speed Photo-Printing Apparatus," now U.S. Pat. No. 6,842,186 B2, which is hereby incorporated by reference;

U.S. patent application Ser. No. 10/254,186, filed on Sep. 25, 2002, entitled "Registration Error Reduction in a Tandem Printer" now U.S. Pat. No. 6,739,688 B2; and a concurrently-filed provisional patent application entitled "Printer Color Correction", Ser. No. 60/516,217 from which priority is claimed in U.S. patent application Ser. No. 10/818,883, filed Apr. 6, 2004, U.S. Patent Application publication No. 2005/0093923 A1.

BACKGROUND

1. Field of the Invention

The present invention relates to color registration and, more particularly, to color registration in multi-head printers.

2. Related Art

Various kinds of printers are well-known in the computing and digital image arts. Such printers include, for example dot-matrix printers, laser printers, inkjet printers and thermal printers. The focus of the present discussion is on thermal printers, so-named because they use thermal energy (heat) to produce printed output. More specifically, thermal printers typically contain a linear array of heating elements (also referred to herein as "print head elements") that print on an output medium by, for example, transferring pigment from a donor sheet to the output medium or by initiating a color-forming reaction in the output medium. The output medium is typically a porous receiver receptive to the transferred pigment, or a paper coated with the color-forming chemistry. Each of the print head elements, when activated, forms color on the medium passing underneath the print head element, creating a spot having a particular density. Regions with larger or denser spots are perceived as darker than regions with smaller or less dense spots. Digital images are rendered as two-dimensional arrays of very small and closely-spaced spots.

Conventional color thermal printers typically include multiple thermal print heads, each of which is responsible for printing a distinct color. In a four-head printer, for example, the four print heads may be responsible for printing cyan, magenta, yellow, and black, respectively. The print heads are typically are spaced some distance apart from each other in a row or other configuration.

The medium on which output is to be printed (referred to as the "output medium," "web," or "receiver") typically is provided on a continuous roll, referred to as the "receiver roll." The receiver is pulled from the receiver roll through the printer by a drive capstan roller located after the final print head. In this manner the receiver passes by and makes contact with each print head in succession. Each print head transfers pigment of a corresponding color from a donor element to the receiver as the receiver passes by it. In this way, a four color image may be printed by successively printing each of four single-color layers on the output medium. The processes of printing distinct colors of an image at successive print stations is referred to as "tandem printing."

Printing a single four-color image in this manner requires that the image layers be in precise registration (alignment) with each other. The "registration" of multiple layers (and of individual dots within them) refers to the relative position between the layers. Ideally, all layers in an image are superimposed exactly on (i.e., precisely registered with) each other. Even a slight misregistration may cause noticeable visual artifacts, thereby detracting from the perceived quality of the resulting image.

Misregistration may be caused by any of a variety of factors. For example, although in an ideal printer the receiver moves through the printer at a constant speed, in practice the speed of the receiver may vary. Such variations in speed, if not properly taken into account, may cause a particular print head to print some or all of an image at the wrong location on the receiver, causing misregistration and other problems. For example, variation in the speed of the receiver while a print head is printing may cause the image layer being printed either to be compressed (if the receiver slows down) or stretched (if the receiver speeds up) on the receiver. Although such a distortion may not be objectionable in an image printed by a single print head, multiple such distortions superimposed on each other by multiple print heads can cause problems such as color variations in what should be areas of uniform color.

Various attempts have been made to ensure proper registration among the various layers of an output image by correcting for variations in receiver speed. For example, registration marks may be printed along the lateral edges of the output medium. Optical sensors positioned at each print head may read the registration marks to enable the printer to continuously recalculate the correct printing position for each layer of the image to be printed, thereby allowing the printer to compensate for shifting and stretching of the image on the output medium that may occur at or between each print head. An integral relationship may be established between the circumference of two output capstan drive rollers and the distance between successive print heads. Improved techniques for tracking the receiver web are disclosed in the commonly-owned and co-pending patent application entitled "Registration Error Reduction in a Tandem Printer."

Techniques for correcting misregistration typically rely on the dimensions of the print heads remaining fixed over time. Misregistration may still even when such techniques are used, therefore, if the dimensions of two or more print heads change due to factors such as temperature, web stretch, mechanical deformation, or print head wear.

What is needed, therefore, are improved techniques for correcting for registration errors in tandem printers.

SUMMARY

Techniques are disclosed for performing color registration estimation and correction in a multi-head printer. A registration target is printed by the printer and captured by an image capture device (such as a camera) within the printer. The registration target includes a plurality of shapes, each of which is printed by a single one of the print heads in the printer, and which are arranged in a pattern designed to enable cross-web and down-web registration estimates to be generated. The printer analyzes the captured target to generate such cross-web and down-web registration estimates and thereby to generate cross-web and down-web registration corrections. The printer applies the registration corrections to subsequent print jobs, thereby reducing or eliminating misregistration in printed output. The techniques disclosed herein are suitable for use in printers having print heads that differ in resolution from each other.

In one aspect of the present invention, a computer-implemented method is provided for use in a printer. The method comprises steps of: (A) receiving a representation of a subset of an image printed by the printer; (B) identifying a first pattern in the subset of the image, the first pattern encoding a position of the subset along an axis of the image; (C) identifying the position of the subset along the axis of the image based on the first pattern; and (D) estimating a color misregistration along the axis of the image based on the position of the subset along the axis of the image.

In another aspect of the present invention, a computer-implemented method is provided for use in a tandem printer. The printer includes a first print head for printing at a first resolution and a second print head for printing at a second resolution that differs from the first resolution. The method includes steps of: (A) receiving a representation of a subset of an image printed by the printer; (B) identifying a first pattern in the subset of the image, the first pattern encoding a position of the subset along an axis of the image, the axis running in a cross-web direction of the image, the first pattern comprising a subset of a second pattern having a plurality of zones containing a plurality of unique sub-patterns; (C) identifying the position of the subset along the axis of the image based on the first pattern by performing steps of: (1) identifying one of the plurality of unique sub-patterns in the first pattern; and (2) identifying the position of the subset along the axis of the image based on the identified sub-pattern; (D) estimating a color misregistration along the axis of the image based on the position of the subset along the axis of the image by performing steps of: (1) identifying an expected distance between a first shape having a first color and a second shape having a second color in the subset of the image based on the position of the subset along the axis of the image; (2) estimating an actual distance between the first and second shapes based on the representation of the subset of the image; and (3) estimating the color misregistration along the axis of the image as the difference between the expected distance and the estimate of the actual distance between the first and second shapes.

In another aspect of the present invention, a data structure tangibly embodied in a computer readable-medium and suitable for printing as a calibration image for use in performing color registration correction in a multi-color printer is provided. The data structure represents an image having a first axis. The image includes a plurality of regions positioned along the first axis. The plurality of regions includes a plurality of patterns. Each pattern P in the plurality of patterns encodes the position of pattern P along the first axis. The plurality of patterns may include a plurality of lines positioned along the first axis and running parallel to a second axis of the image; and a plurality of shapes abutting the plurality of lines.

In a further aspect of the present invention, a data structure is provided that is tangibly embodied in a computer readable-medium and suitable for printing as a calibration image for use in performing color registration correction in a multi-color printer including a plurality of print heads. The data structure represents an image having a first axis. The image includes a plurality of regions positioned along the first axis. The plurality of regions includes a plurality of patterns. Each pattern P in the plurality of patterns encodes the position of pattern P along the first axis. The plurality of patterns includes: (1) a plurality of lines positioned along the first axis and running parallel to a second axis of the image; and (2) a plurality of shapes abutting the plurality of lines, wherein the plurality of lines have a plurality of colors, and wherein each of the plurality of lines has a single color suitable for printing by a single print head in the printer.

In yet another aspect of the present invention, a computer-implemented method is provided for use in a printer including a first print head for printing at a first resolution and a second print head for printing at a second resolution that differs from the first resolution. The method includes steps of: (A) receiving a representation of a subset of an image printed by the printer; (B) identifying, in the subset of the image, a first shape printed by the first print head; (C) identifying, in the subset of the image, a second shape printed by the second print head; (D) estimating locations of the first and second shapes along the first axis of the image based on the representation of the subset of the image; and (E) estimating a color misregistration along the first axis of the image as the difference between the location of the first shape and the location of the second shape along the first axis of the image.

In yet a further aspect of the present invention, a computer-implemented method is provided for use in a tandem printer including a first print head for printing at a first resolution and a second print head for printing at a second resolution that differs from the first resolution. The method includes steps of: (A) receiving a representation of a subset of an image printed by the printer; (B) identifying, in the subset of the image, a first shape printed by the first print head; (C) identifying, in the subset of the image, a second shape printed by the second print head; (D) estimating locations of the first and second shapes along a first axis of the image based on the representation of the subset of the image, the first axis running in a down-web direction of the printer, by performing steps of: (1) identifying a center of the first shape along the first axis; (2) identifying a center of the second shape along the first axis; (3) estimating the location of the first shape as the identified center of the first shape; (4) estimating the location of the second shape as the identified center of the second shape; and (E) estimating a color misregistration along the first axis of the image as the difference between the location of the first shape and the location of the second shape along the first axis of the image.

In another aspect of the present invention, a computer-implemented method is disclosed for use in a printer. The method includes steps of: (A) receiving a representation of a subset of an image printed by the printer, the subset of the image comprising a first plurality of shapes printed by the first and second print heads; (B) identifying a position of the subset along a first axis of the image; (C) identifying an expected distance between a first one of the first plurality of shapes printed by the first print head and a second one of the first plurality of shapes printed by the second print head based on the position of the subset along the first axis of the image; (D) estimating an actual distance between the first and second shapes based on the representation of the subset of the image; (E) estimating a first color misregistration along the first axis as the difference between the expected distance and the estimated actual distance between the first and second shapes; (F) identifying, in the subset of the image, a third shape printed by the first print head; (G) identifying, in the subset of the image, a fourth shape printed by the second print head; (H) estimating locations of the third and fourth shapes along a second axis of the subset of the image based on the representation of the subset of the image; and (I) estimating a second color misregistration along the second axis as the difference between the location of the third shape and the location of the fourth shape along the second axis of the image.

Printers for performing the methods summarized above are also disclosed. Other features and advantages of various aspects and embodiments of the present invention will become apparent from the following description and from the claims.

DETAILED DESCRIPTION

Techniques are disclosed for performing color registration estimation and correction in a multi-head printer. A registration target is printed by the printer and captured by an image capture device (such as a camera) within the printer. The registration target includes a plurality of shapes, each of which is printed by a single one of the print heads in the printer, and which are arranged in a pattern designed to enable cross-web and down-web registration estimates to be generated. The printer analyzes the captured target to generate such cross-web and down-web registration estimates and thereby to generate cross-web and down-web registration corrections. The printer applies the registration corrections to subsequent print jobs, thereby reducing or eliminating misregistration in printed output. The techniques disclosed herein are suitable for use in printers having print heads that differ in resolution from each other.

Figure 1:
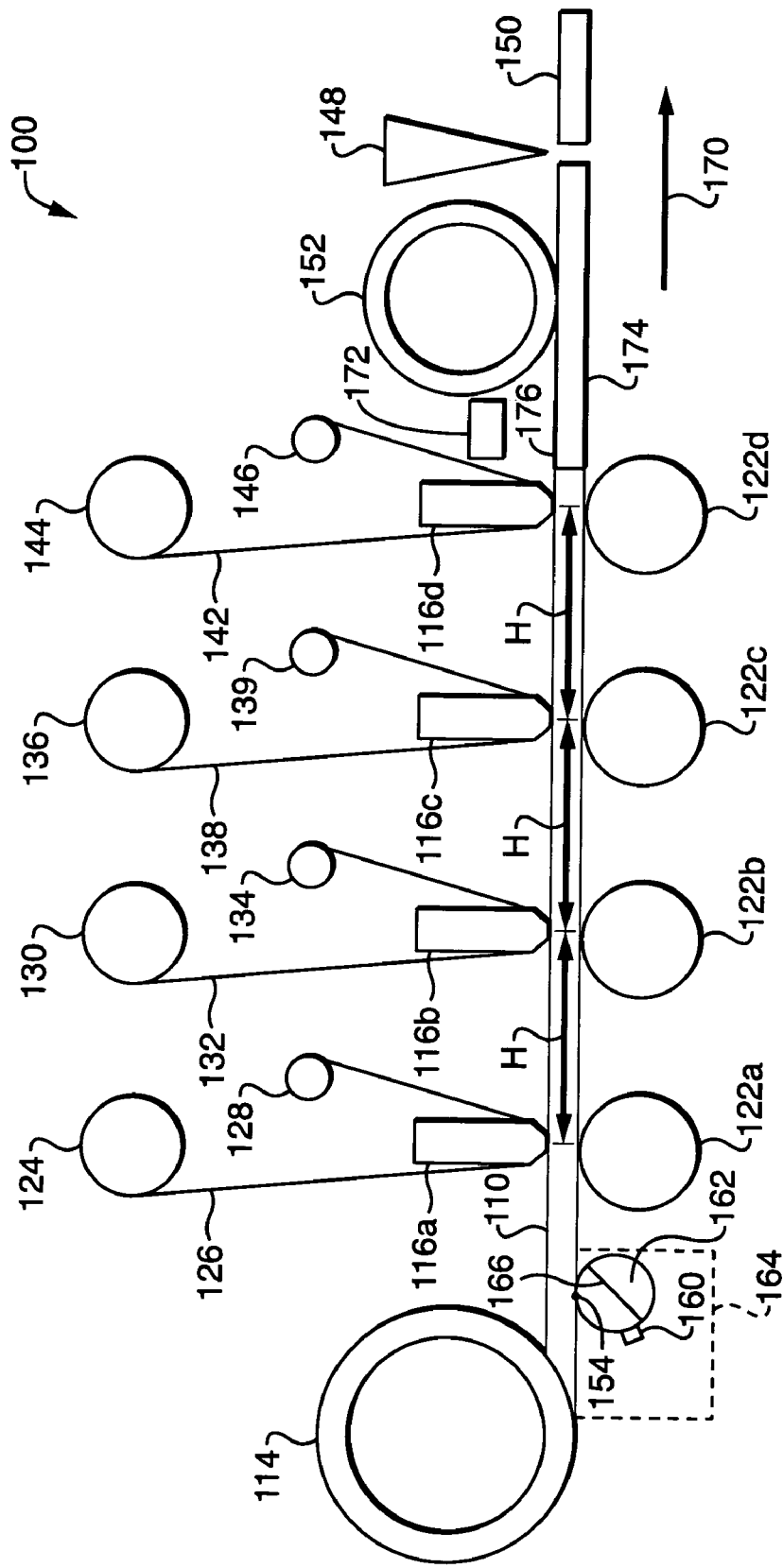
FIG. 1 is a side view of a multi-head tandem printing mechanism according to one embodiment of the present invention.

Referring to FIG. 1, a multi-head tandem printing mechanism 100 according to one embodiment of the present invention is shown. The printing mechanism 100 may, for example, be used in a commercial photo-printing kiosk, as described in more detail in the above-referenced patent application entitled "A High-Speed Photo-Printing Apparatus."

Receiver 110 is fed from a receiver roll 114. Although the path of receiver 110 is shown as straight in FIG. 1, it should be understood that other paths, for example curved or arcuate paths, may also be used. The receiver 110 is translated past three thermal print heads 116a–c, opposed by platen rollers 122a–d respectively. The first thermal print head 116a is fed from roll 124 with a donor element 126, bearing the first of the three subtractive primary colors (cyan, magenta, or yellow). The order of printing of the colors may vary. After printing of the first color, the spent donor element is taken up on a roll 128. The second thermal print head 116b is fed from roll 130 with donor element 132, corresponding to the second primary color. The spent donor element is taken up on roll 134. The third thermal print head 116c is fed from roll 136 with donor element 138, corresponding to the third primary color. The spent donor element is taken up on roll 139.

A fourth printing head (or heating element) 116d may optionally be used for applying an overcoat layer 142, which may be laminated or transferred to receiver 110. Alternatively, element 142 may be a white, opaque substrate. The overcoat or white opaque substrate 142 is fed from roll 144. If a carrier web is used for the overcoat or white opaque substrate 142, it is taken up on roll 146. If no carrier web is used, substrate 142 is simply laminated to receiver 110, and roller 146 is not needed. Following lamination or transfer of substrate 142, a cutter 148 may be used to separate the printed images, such as a final printed image 150 onto which all three primary colors have been printed. The cutter 148 may optionally separate a small sliver (not shown) of receiver 110 between images so as not to have to precisely register a single cut with the junction between successive pictures. The slivers so separated may be directed into a receptacle (not shown) for later disposal. The prints themselves may be delivered to the user by means of a chute or similar device.

Donor elements 126, 132 and 138 may comprise very thin substrates (of thickness typically in the range 2.5–8 micrometers) onto which the appropriate donor material has been coated. In the case of dye diffusion thermal transfer, the donor material is typically a dye incorporated into a polymer binder, as described for example in Hann, R. A. and Beck, N. C., J. Imaging Technol., (1990), 16(6), 138–241 and Hann, R. A., Spec. Pub. R. Soc. Chem. (1993), 133, 73–85.

In the case of thermal mass transfer, the donor material is commonly a dye or pigment formulated with a wax or resin (or a combination of the two) as vehicle, as described for example in U.S. Pat. No. 5,569,347. Alternatively, however, thermal mass transfer imaging may be used, in which case the donor element may be such as is described in commonly-owned U.S. patent application Ser. No. 09/745,700, filed Dec. 21, 2000, entitled: "Thermal Transfer Recording System."

The receiver 110 should be chosen so as to be compatible with the donor material used. Thus, for dye diffusion thermal transfer, the receiver 110 bears a polymer coating for accepting the transferred dyes, as described in Hann, R. A. and Beck, N. C., J. Imaging Technol., (1990), 16(6), 138–241 and Hann, R. A., Spec. Pub. R. Soc. Chem. (1993), 133, 73–85. For thermal mass transfer, the receiver may bear a microporous layer, as described for example in U.S. Pat. Nos. 5,521,626 and 5,897,254, or a softening layer, as described for example in U.S. Pat. No. 4,686,549. As described for example in U.S. Pat. No. 5,144,861, the receiver 110 used for thermal transfer media of either type are desirably compliant and of uniform thermal conductivity. One example of the receiver 110 for use in conjunction with a thermal mass transfer donor element according to the invention is described in commonly-owned U.S. patent application Ser. No. 10/159871, filed May 30, 2002, entitled "Thermal Mass Transfer Imaging System, now U.S. Pat. No. 6,761,788 B2."

Receiver 110 may be opaque or transparent. In the case where receiver 110 is transparent, and a reflective print is the desired output, substrate 142 is desirably opaque, and the final image is viewed through receiver 110. In the case wherein receiver 110 is opaque, and the material transferred by element 140 is transparent, the final image is viewed through the material transferred by element 116d. The image printed in one case is the mirror image of that printed in the other.

The printing mechanism 100 may also include an optical encoder 160 mounted on a roller 162 (referred to as the "encoder roller") in contact with the receiver 110. The encoder 160 and encoder roller 162 are illustrated in outline for ease of illustration. As described in more detail in the above-referenced patent application entitled "Registration Error Reduction in a Tandem Printer," the combination of the optical encoder 160 and the encoder roller 162 may serve as a tachometer 164 to measure the transport speed (print speed) of the receiver 110 as it passes through the print mechanism 100, which information may in turn be used to reduce the effect of mechanical errors on color registration in the printed image 150.

Figure 2:
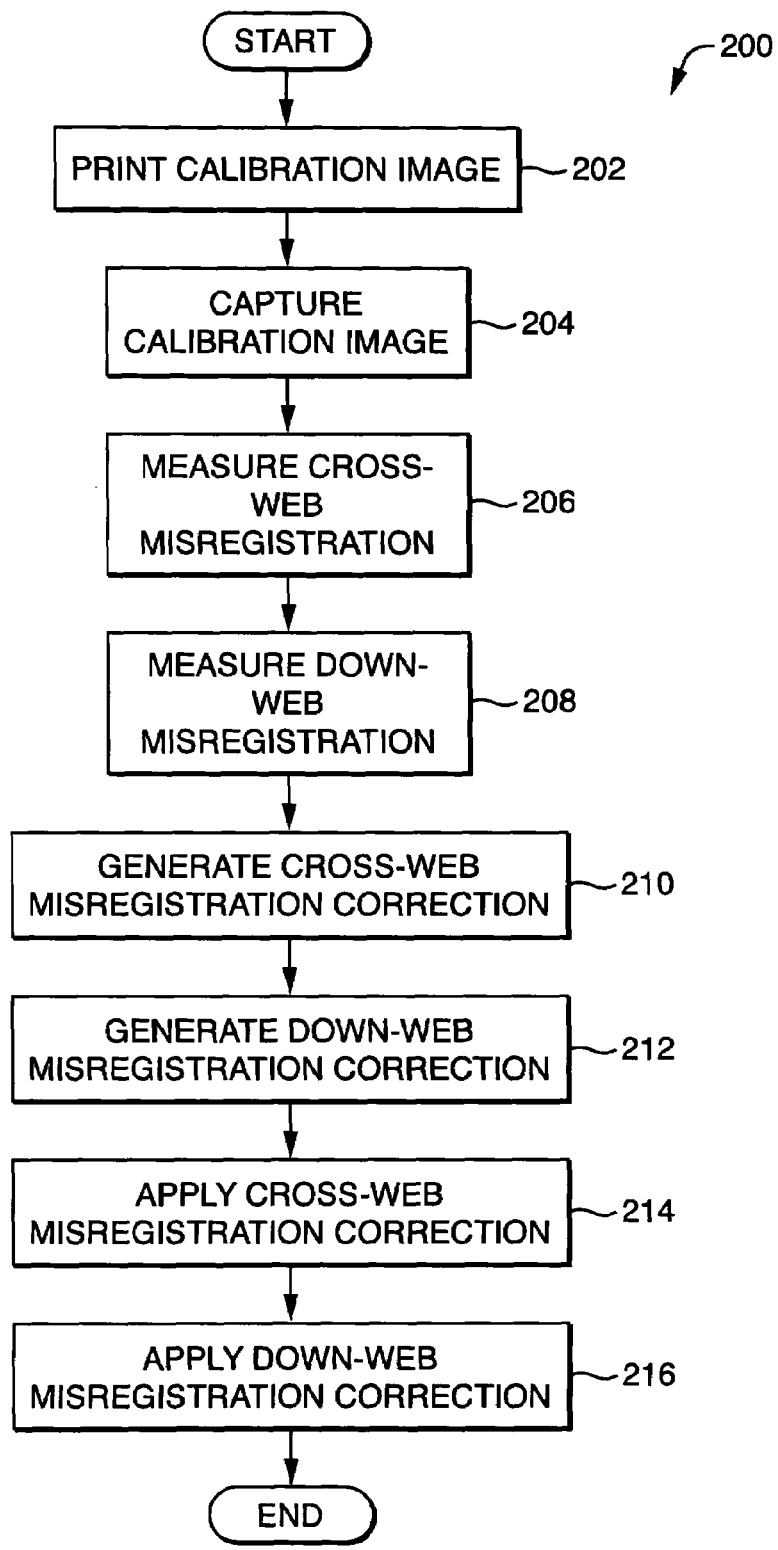
FIG. 2 is a flowchart of a method that is used in one embodiment of the present invention to estimate and correct for registration errors in a multi-head printer.
Figure 3:
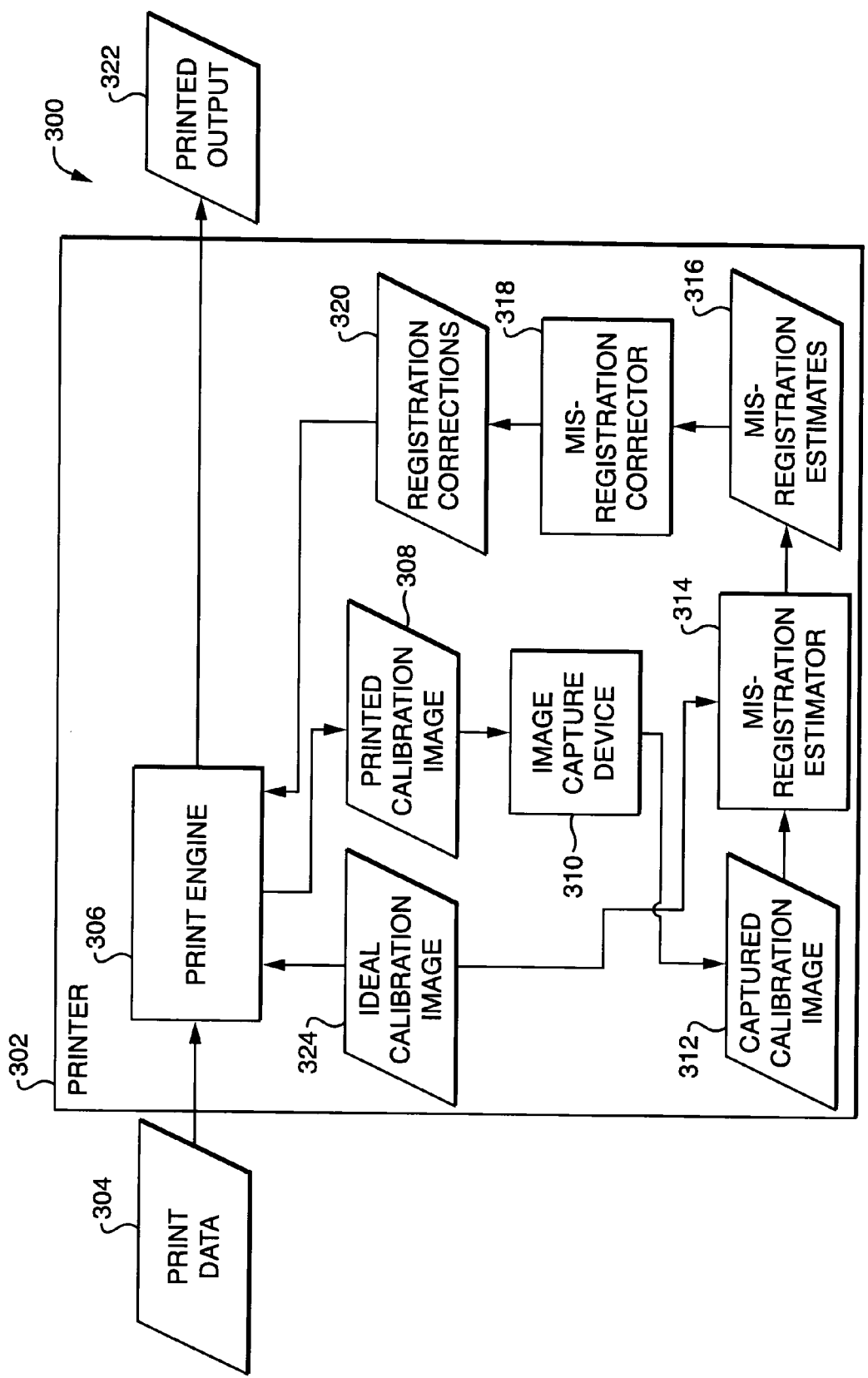
FIG. 3 is a functional block diagram of a system that performs the method of FIG. 2 according to one embodiment of the present invention.

Examples of techniques will now be described for correcting registration errors in a multi-head printer according to embodiments of the present invention. Referring to FIG. 2, a flowchart is shown of a method 200 that is used in one embodiment of the present invention to correct for registration errors in a multi-head printer having a print mechanism such as the mechanism 100 shown in FIG. 1. Referring to FIG. 3, a functional block diagram is shown of a system 300 that includes a multi-head printer 302 that may perform the method 200 of FIG. 2.

The printer 302 receives print data 304 to be printed in a print job. The printer 302 includes a print engine 306 that may include a print mechanism such as the print mechanism 100 shown in FIG. 1. The print engine 306 receives the print data 304 and registration corrections 320 as inputs. As described in detail below, the registration corrections 320 may indicate cross-web and/or down-web offsets to be applied to correct for registration errors in output previously produced by the print engine 306. The print engine 306 renders the print data 304 and prints the print data 304 with the registration corrections 320 applied, thereby producing the printed output 322. The print data 304 may, for example, be a digital photograph and the printed output 322 may be a 4"×6" print of the photograph.

After printing the printed output 322, the print engine 306 prints a calibration image 308, also referred to as a "target," on an output medium (FIG. 2, step 202). The printed calibration image 308 may, for example, be printed on the same roll as the printed image 150 (FIG. 1) in a portion 174 of the receiver 110 that immediately follows the printed image 150.

A particular embodiment of the calibration image 308 will be described below with respect to FIG. 4A. In general, the calibration image 308 may, for example, include a plurality of printed regions, each of which is printed by a single one of the print heads 116a–c. In the case where each of the print heads 116a–c prints a distinct color, each of the printed regions in the calibration image 308 may be monochrome. Each print head, however, may print multiple regions in the calibration image 308, thereby resulting in multiple regions in the calibration image 308 having the same color.

The printer 302 also includes an image capture device 310 that captures the printed calibration image 308, thereby producing a captured calibration image 312 (FIG. 2, step 204). The captured calibration image 312 may, for example, be a digital image of the calibration image 308 stored in an image format such as JPEG with minimal (e.g., 10%) compression to retain as much information in the image as possible.

For example, referring again to FIG. 1, the print mechanism 100 includes a camera 172 positioned above the receiver 110. The camera 172 is one example of the image capture device 310. In one embodiment of the present invention, the camera 172 is a model 511 CMOS camera available from OmniVision Technologies, Inc. of Sunnyvale, Calif. The model 511 has a field of view of 44×58 mils and produces images that are 640 pixels wide by 480 pixels high. The model 511 is simply one example of a device that may be used as the image capture device 310 and does not constitute a limitation of the present invention.

Note that the camera 172, printed image 150, and receiver portion 174 are not drawn to scale in FIG. 1. As will be described in more detail below, the camera 172 may capture a region 176 of the calibration image printed on the receiver portion 174 as the receiver portion 174 passes underneath the camera 172.

The printer 302 also includes a misregistration estimator 314. The misregistration estimator 314 analyzes the captured calibration image 312 to generate estimates 316 of the misregistration in the calibration image 308. In particular, the misregistration estimator 314 may estimate both cross-web misregistration (FIG. 2, step 206) and down-web misregistration (step 208). The term "down-web" refers to the direction in which the output medium moves through the printer 302. For example, in FIG. 1, the arrow 170 indicates the direction in which receiver 110 moves through the print mechanism 100 and thereby also indicates the down-web direction.

The printer 302 also includes a misregistration corrector 318 that produces registration corrections 320 based on the misregistration estimates 316. The registration corrections 320 may, for example, include a cross-web and down-web offset (measured, for example, in microns) for each of the print heads 116a–c (steps 210–212). The registration corrections 320 may, for example, simply be the additive inverses of the misregistration estimates 316.

On subsequent print jobs, the print engine 306 may apply the registration corrections 320 and thereby compensate for the estimated misregistrations 316 by shifting color planes in the rendition of the print data by one or more pixels in the case of cross-web misregistration (step 214) and delaying the output of the print heads 116a–c by appropriate periods of time in the case of down-web misregistration (step 216). As a result, subsequent output printed by the printer 302 should have decreased registration error in both the down-web and cross-web directions.

Having described operation of the method 200 and system 300 in general, particular embodiments of the method 200 and system 300 will now be described.

Figure 5A:
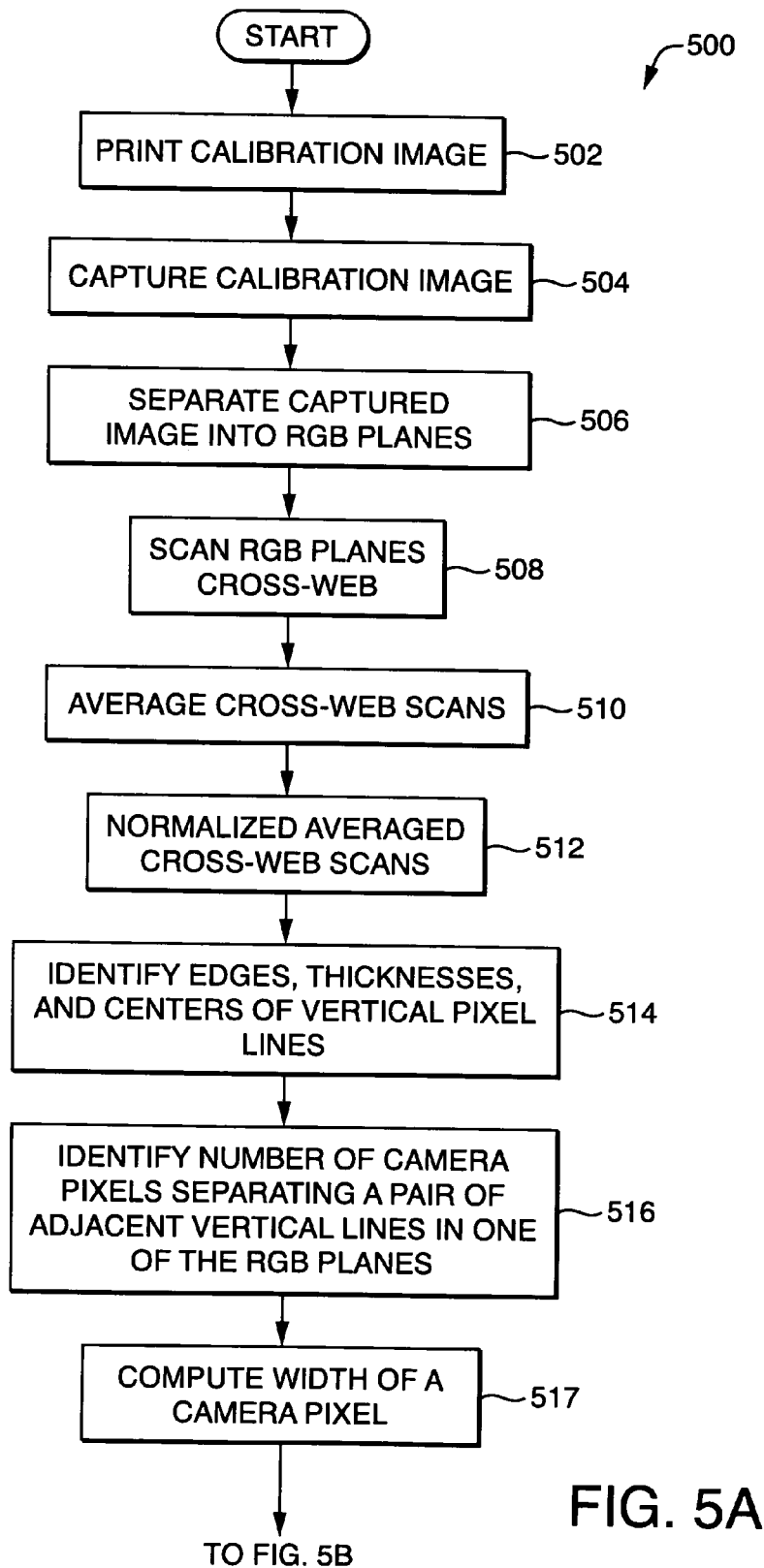
FIGS. 5A–5B are flowcharts of a method that is used in one embodiment of the present invention to estimate and correct for registration errors in a multi-head printer.
Figure 5B:
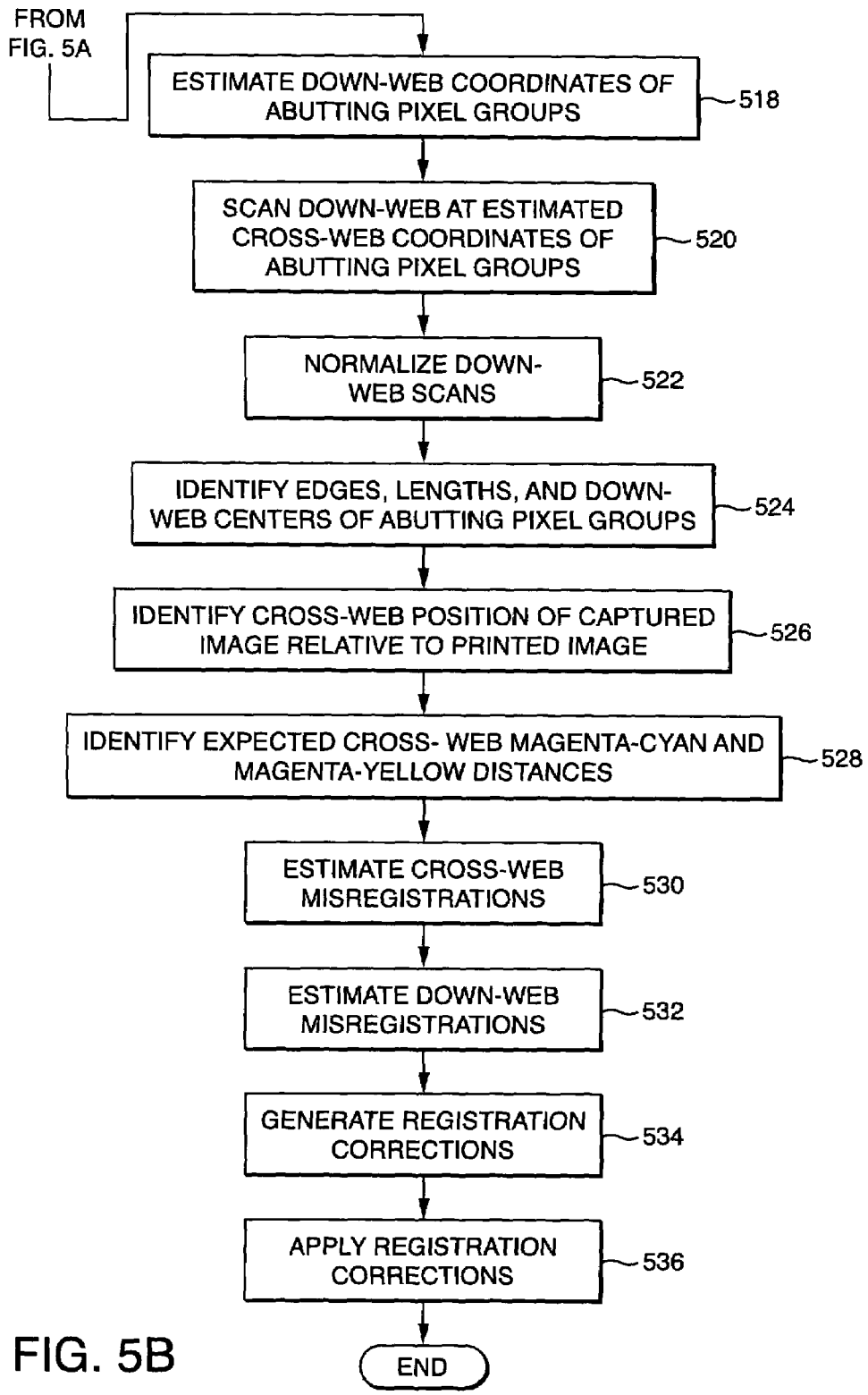
Figure 6A:
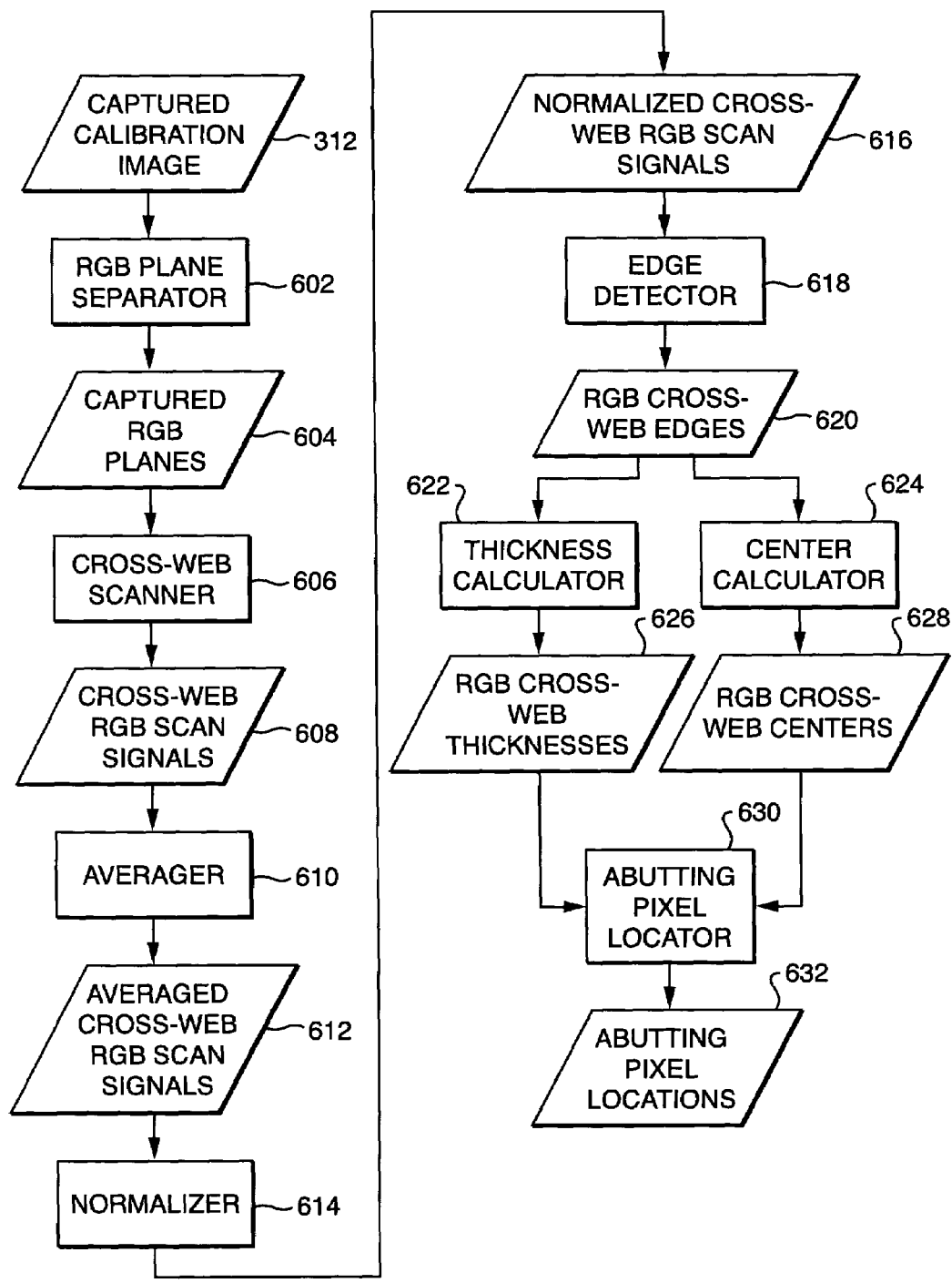
FIGS. 6A–6C are functional block diagrams of a system that performs the method of FIGS. 5A–5B according to one embodiment of the present invention.
Figure 6B:
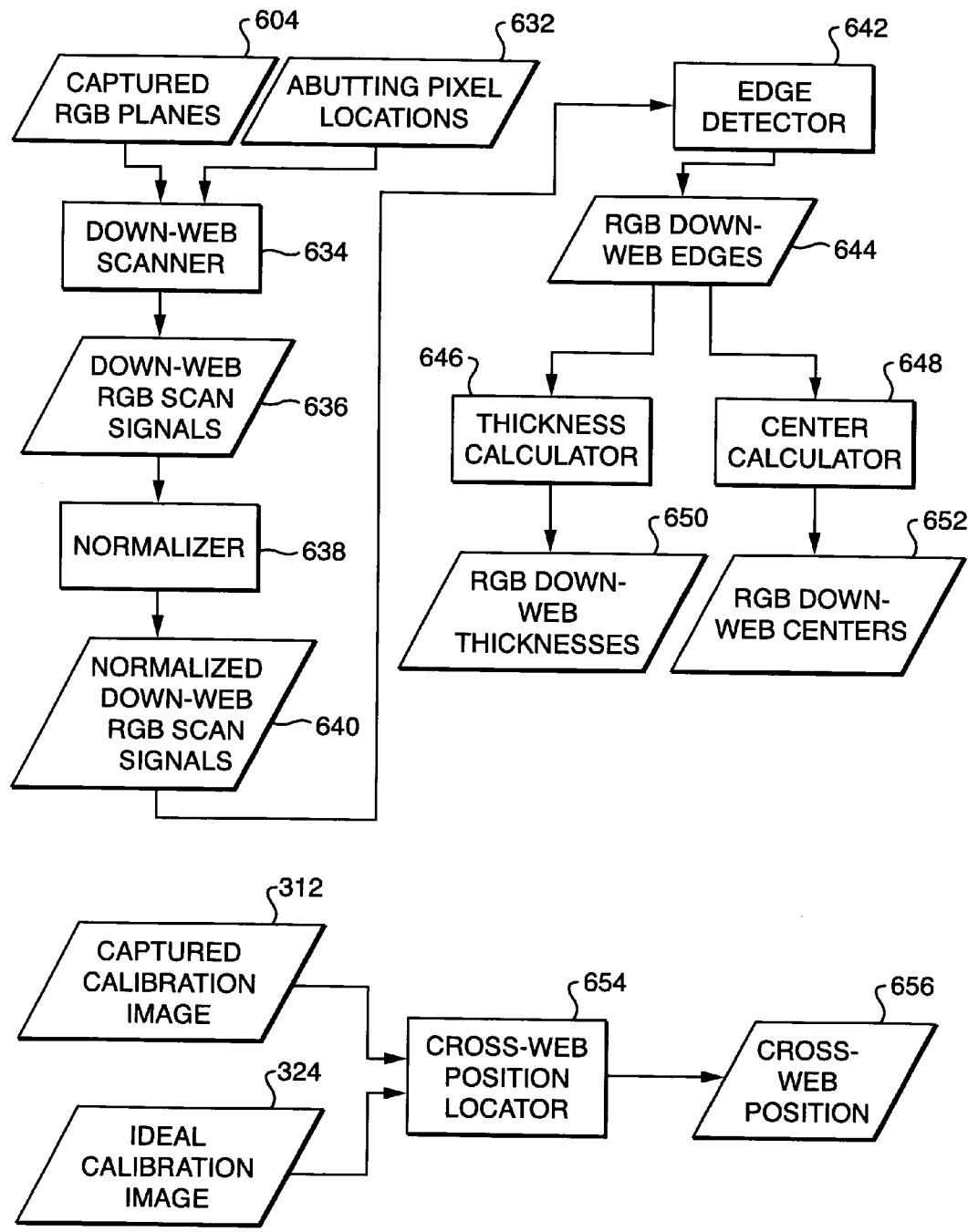
Figure 6C:
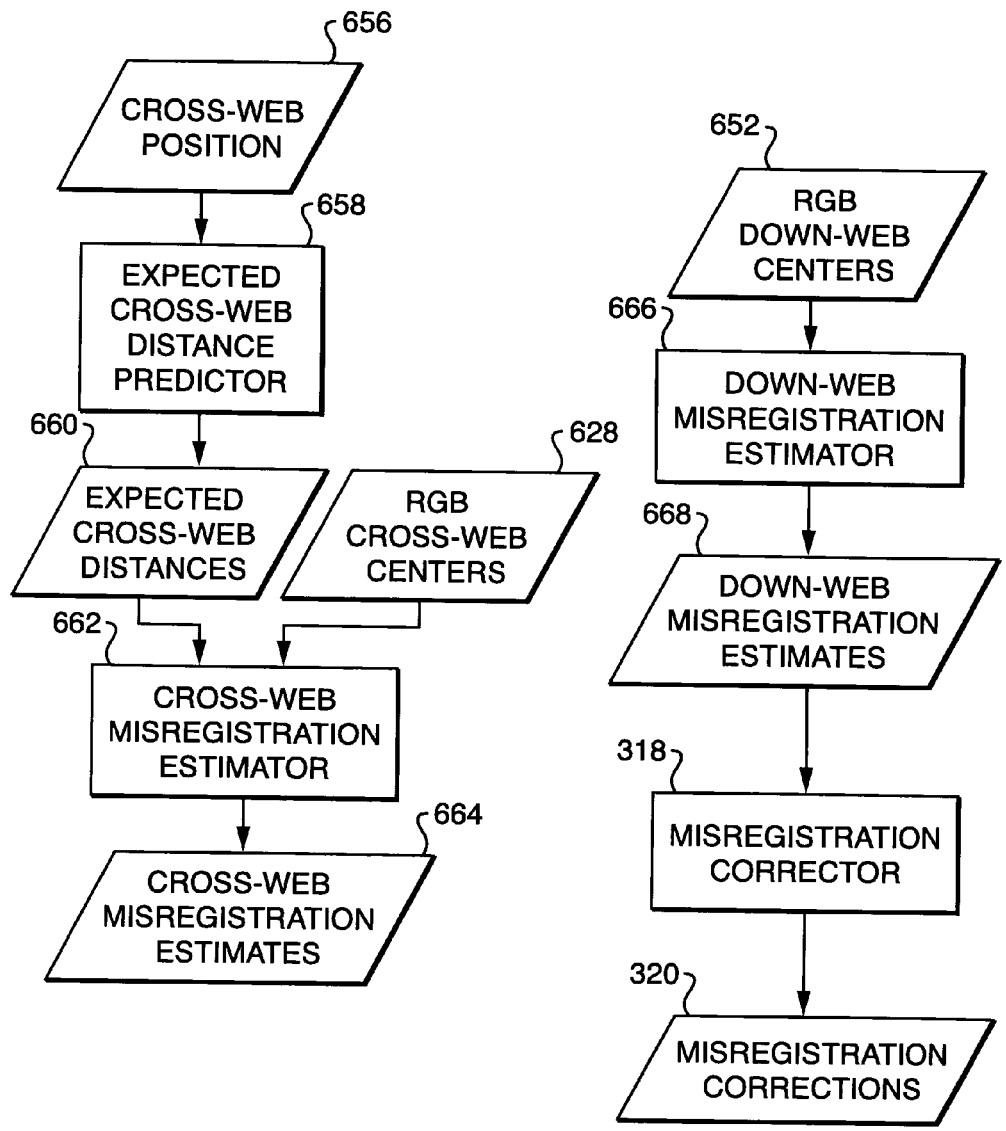

Referring to FIGS. 5A–5B, flowcharts are shown of a method 500 that is used in one embodiment of the present invention to perform misregistration estimation and registration correction in a multi-head printer. The method 500 may, for example, be performed by the printer 302, which may include a multi-head print mechanism such as the print mechanism 100 shown in FIG. 1. Referring to FIGS. 6A–6C, functional block diagrams are shown of a system 600 that performs the method 500 of FIG. 5 according to one embodiment of the present invention.

As described above, the printed calibration image 308 may be printed after each print job or after each of a plurality of print jobs (step 502). In one embodiment of the present invention, the printed calibration image 308 is 0.2 inches wide by 6.0 inches long. The region 174 in which the calibration image 308 is printed may include both the printed calibration image 308 and a second calibration image (not shown) that may be used to perform color correction, as described in more detail in the above-referenced patent application entitled "Printer Color Correction." In one embodiment of the present invention, the region 174 is 4"×6" to accommodate both such calibration images. The region 174 may be removed by the cutter 148 after the printed calibration image 308 is captured by the camera 172 and may then be discarded.

The print engine 306 prints the printed calibration image 308 based on an ideal calibration image 324. The ideal calibration image 324 may, for example, be stored in one or more digital images in a digital image file. For example, the ideal calibration image 324 may include cyan, magenta, and yellow planes, each of which is printed by a distinct one of the print heads 116a–c. In addition to being provided to the print engine 306 to print the printed calibration image 308, the ideal calibration image 324 is provided to the misregistration estimator 314, which may produce the misregistration estimates 316 by comparing the ideal registrations indicated by the information in the ideal calibration image 324 to the estimated misregistrations 316 based on the printed calibration image 308.

Figure 4A:
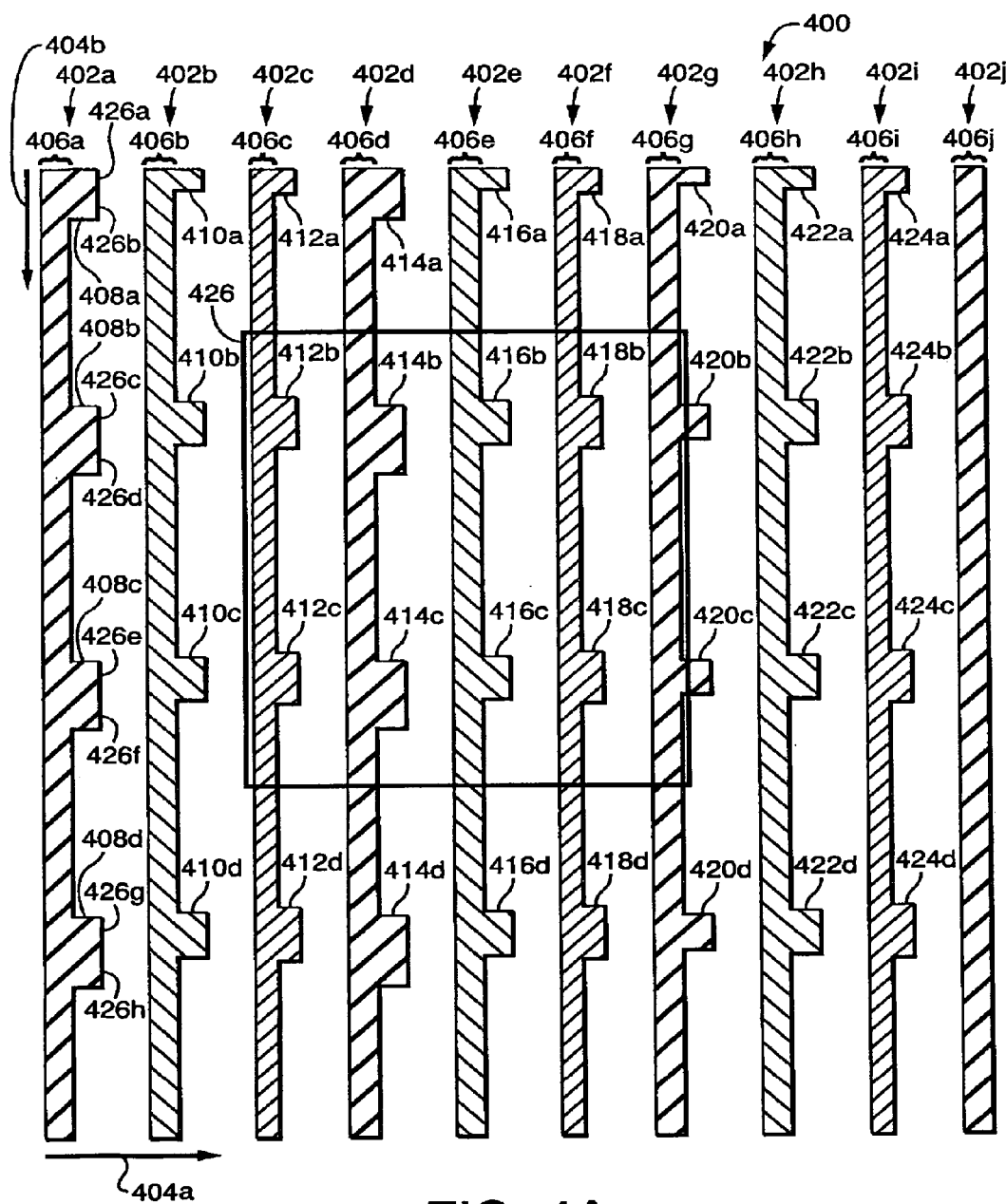
FIG. 4A is a diagram of a portion of a printed calibration image that is used to perform misregistration estimation according to one embodiment of the present invention.
Figure 4B:
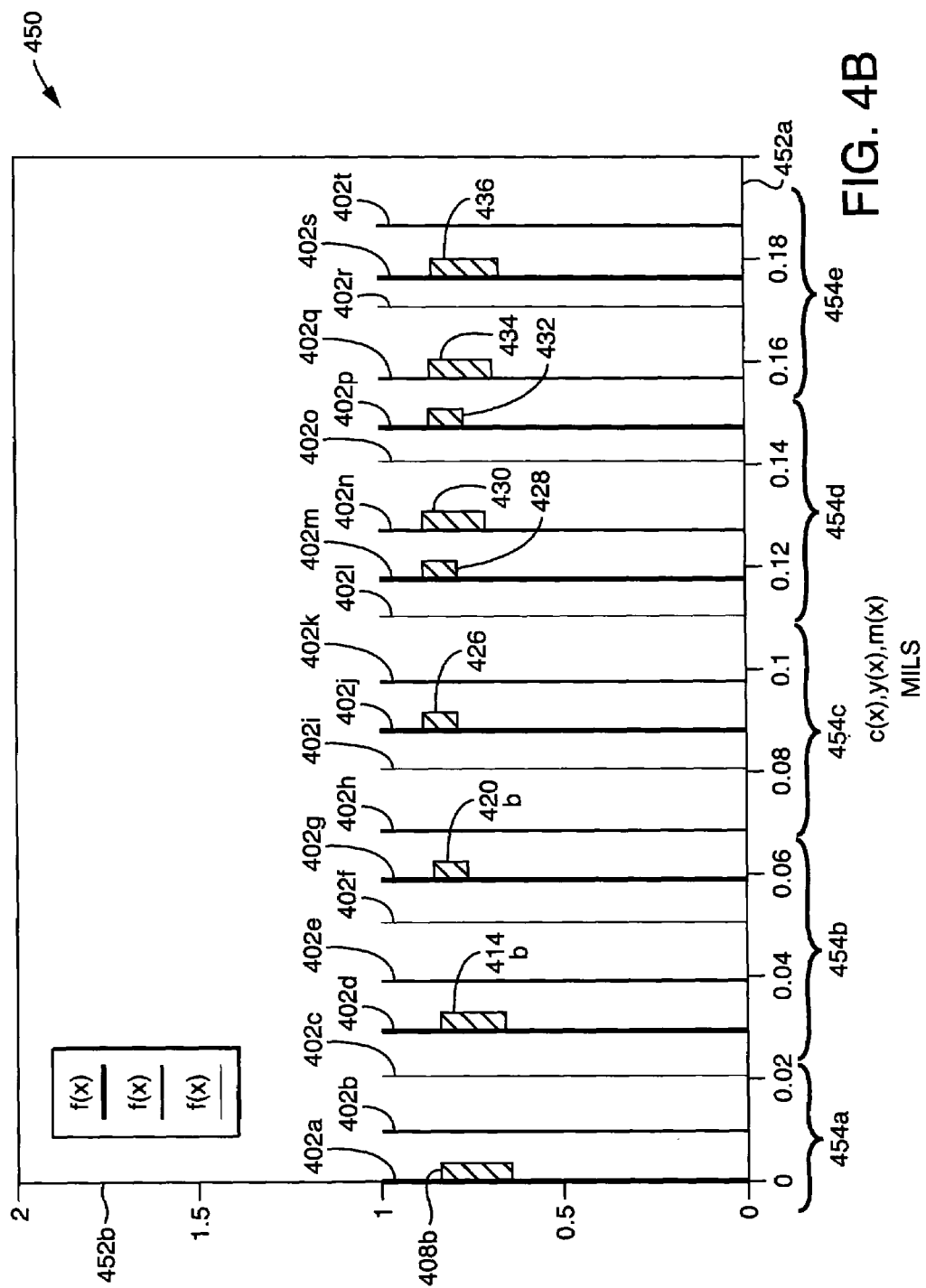
FIG. 4B is a graph that illustrates a calibration pattern that is used to perform misregistration estimation according to one embodiment of the present invention.

Referring to FIG. 4A, a portion 400 of the printed calibration image 308 is shown according to one embodiment of the present invention. The entire calibration image of which the portion 400 is a subset is illustrated in FIG. 4B and will be described below. The calibration image portion 400 includes shapes 402a–j. Each of the shapes 402a–j is printed by a single one of the print heads 116a–c. For example, shapes 402a, 402d, 402g, 402j, 402m, 402p, and 402s are cyan and are printed by cyan print head 116a; shapes 402b, 402e, 402h, 402k, 402n, 402q, and 402t are yellow and are printed by yellow print head 116c; and shapes 402c, 402f, 402i, 402l, 402o, and 402r are magenta and are printed by magenta print head 116b.

Cross-web axis 404a and down-web axis 404b are shown in FIG. 4A for ease of explanation. In the following discussion, the terms "cross-web coordinate," "x coordinate," and "horizontal coordinate" refer to coordinates on the cross-web axis 404a, which originates on the left-hand side of FIG. 4A and increases to the right. Similarly, the terms "down-web coordinate," "y coordinate," and "vertical coordinate" refer to coordinates on the down-web axis 404b, which originates at the top of FIG. 4A and increases downward. More generally, the terms "cross-web" and "horizontal" are used interchangeably herein, as are the terms "down-web" and "vertical." The terms "horizontal" and "vertical" are used for convenience, even though in practice the cross-web and down-web directions inside the print mechanism 100 may vary in their horizontal and vertical orientations depending on the direction in which the receiver 110 travels.

Although the down-web axis 404b increases downward in FIG. 4A, it should be appreciated that axis 404b illustrates the direction of movement of the receiver 110 through the print mechanism 100, and that the calibration image 400 is therefore printed beginning at the bottom of FIG. 4A and that subsequent lines of the image 400 are printed upwardly as the receiver 110 moves through the print mechanism 100 in the direction illustrated by down-web axis 404b.

Each of the shapes 402a–j includes both a vertical line of contiguous pixels and an abutting set of non-contiguous pixels. For example, shape 402a includes a vertical line of contiguous cyan pixels 406a and an abutting set of non-contiguous cyan pixel groups 408a–d. Pixel line 406a is exactly one pixel wide. Note that each of the pixel groups 408a–d contains exactly two contiguous pixels. In particular, pixel group 408a includes contiguous pixels 426a–b, pixel group 408b includes contiguous pixels 426c–d, pixel group 408c includes contiguous pixels 426e–f, and pixel group 408d includes contiguous pixels 426g–h.

Shape 402b includes a vertical line of contiguous yellow pixels 406b and an abutting set of non-contiguous yellow pixels 410a–d. Note that each of the pixels 410a–d is a single yellow pixel. Similarly, shape 402e includes a vertical line of contiguous yellow pixels 406e and an abutting set of non-contiguous yellow pixels 416a–d. Similarly, shape 402h includes a vertical line of contiguous yellow pixels 406h and an abutting set of non-contiguous yellow pixels 422a–d.

Shape 402c includes a vertical line of contiguous magenta pixels 406c and an abutting set of non-contiguous magenta pixels 412a–d. Similarly, shape 402f includes a vertical line of contiguous magenta pixels 406f and an abutting set of non-contiguous magenta pixels 418a–d. Similarly, shape 402i includes a vertical line of contiguous magenta pixels 406i and an abutting set of non-contiguous magenta pixels 424a–d.

The calibration image portion 400 is not drawn to scale. Rather, the pixels and the spacing between them are significantly magnified in FIG. 4A for ease of illustration and explanation. In the embodiment illustrated in FIG. 4A, cyan pixels (i.e., the pixels in shapes 402a, 402d, 402g, and 402j) are enlargements of pixels that are printed at 400 dpi, yellow pixels (i.e., the pixels in shapes 402b, 402e, and 402h) are enlargements of pixels that are printed at 320 dpi, and magenta pixels (i.e., the pixels in shapes 402c, 402f, and 402i) are enlargements of pixels that are printed at 266⅔ dpi. The use of mixed-dpi print heads may be useful for reducing visual artifacts such as moire' patterns. Shapes in the calibration image 308 that differ in color will also differ in resolution due to the differing resolutions of the print heads 116a–c.

Referring to FIG. 4B, a graph is shown that illustrates the entire calibration image pattern 450 of which the portion 400 shown in FIG. 4A is a part. The x-axis 452a of the graph runs in the cross-web direction, while the y-axis 452b runs in the down-web direction. Both axes 452a–b are labeled in mils.

The pattern 450 is divided into five equally-sized zones 454a–e, labeled in FIG. 4B as zone −2, zone −1, zone 0, zone 1, and zone 2, respectively. Abutting pixel groups in the pattern 450 (i.e., pixel groups 408b, 414b, 420b, 426, 428, 430, 432, 434, and 436) are arranged in a particular pattern that assists in the misregistration correction process. In particular, each of the zones 454a–e contains a particular unique pattern of pixel groups that can be used to identify the particular zone that is captured within the captured calibration image 312. In particular, zone 454a is the only zone that contains exactly one large (double) cyan pixel group 408b; zone 454b is the only zone that contains exactly one large cyan pixel group 414*b* and one small (single) cyan pixel group 420*b*; zone 454*c* is the only zone that contains exactly one small cyan pixel group 426; zone 454*b* is the only zone that contains exactly one small cyan pixel group 428 and one large yellow pixel group 430; and zone 454*e* is the only zone that contains exactly one large yellow pixel group 434 and one large cyan pixel group 436. The manner in which this pattern 450 is used to assist in misregistration estimation and correction will be described in more detail below.

The image capture device 310 (e.g., the camera 172) captures the printed calibration image 308 (step 504). The camera 172 may, for example, take a snapshot of the printed calibration image 308 while it moves underneath the camera 172. Alternatively, the receiver 110 may be stopped when the printed calibration image 308 becomes positioned underneath the camera 172, at which time the camera 172 may take a snapshot of the printed calibration image 308. The camera 172 may transfer the captured calibration image 312 to a computer (not shown) within the printer 302 using, for example, a multiplexed frame grabber or an analog-to-digital converter.

The image capture device 310 may not capture the entire image 400. For example, the field of view 426 of the camera 172 is shown in FIG. 4A according to one embodiment of the present invention. The captured calibration image 312, therefore, may include only that portion of the calibration image 400 which falls within the field of view 426.

Estimation of the cross-web and down-web misregistration in the printed calibration image 308 may be complicated by variability in the image capture process. For example, it may not be possible in practice to control the location of the image capture device's field of view 426 with a high degree of accuracy. As a result, it may not be possible to control with precision which portion of the printed calibration image 308 is captured by the image capture device 310. Furthermore, it may not be possible in practice to control the magnification of the image capture device 310 with a high degree of accuracy. As will now be described in more detail, the method 500 may compensate for these kinds of variability to produce sufficiently accurate misregistration estimates 316.

For example, the method 500 calculates the size of a single "camera pixel," i.e., the dimensions of a single pixel in the captured calibration image 312. The "dimensions" of a camera pixel refers to the dimensions of the region in the printed calibration image 308 to which the camera pixel corresponds. Although it is assumed in the following description that each camera pixel corresponds to a square region in the printed calibration image 308, this is merely an example and does not constitute a limitation of the present invention.

Let $R_P(i)$ be the actual output resolution of print head i, where i ranges from 0 to 3 in the print mechanism 100 illustrated in FIG. 1. The resolution $R_P(i)$ of each print head typically is known with a high degree of accuracy. For example, in one embodiment of the present invention, the cyan print head 116*a* prints at 400 dpi (i.e., $R_P(0)=400$ dpi), the magenta print head 116*b* prints at 266⅔ dpi (i.e., $R_P(1)=266⅔$ dpi), and the yellow print head 116*c* prints at 320 dpi (i.e., $R_P(2)=320$ dpi). The term "printer pixel" refers herein to a pixel printed by one of the print heads 116*a–c* in the printed calibration image 308. The width $SD_P$ (in printer pixels) of each of the shapes (e.g., vertical pixel lines 406*c–g*) in the captured calibration image 312 is also known with complete certainty, because such information is contained in the ideal calibration image 324. The printed width $PW_P$ of each pixel in the printed calibration image 308 therefore is also known with a high degree of accuracy. In particular, the printed width $PW_P$ of a pixel printed by print head i with resolution $R_P(i)$ (measured, for example, in dots per inch) is equal to $1/R_P(i)$.

With this background, the method 500 calculates the width (in microns) $PW_C$ of a camera pixel as follows. An RGB plane separator 602 separates the captured calibration image 312 into red, green, and blue planes 604 using techniques that are well-known to those of ordinary skill in the art (step 506). A cross-web scanner 606 performs cross-web scans over each of the red, green, and blue planes of the captured calibration image 312 multiple times at equally-spaced vertical intervals, thereby producing cross-web RGB scan signals 608 (step 508).

Figure 4C:
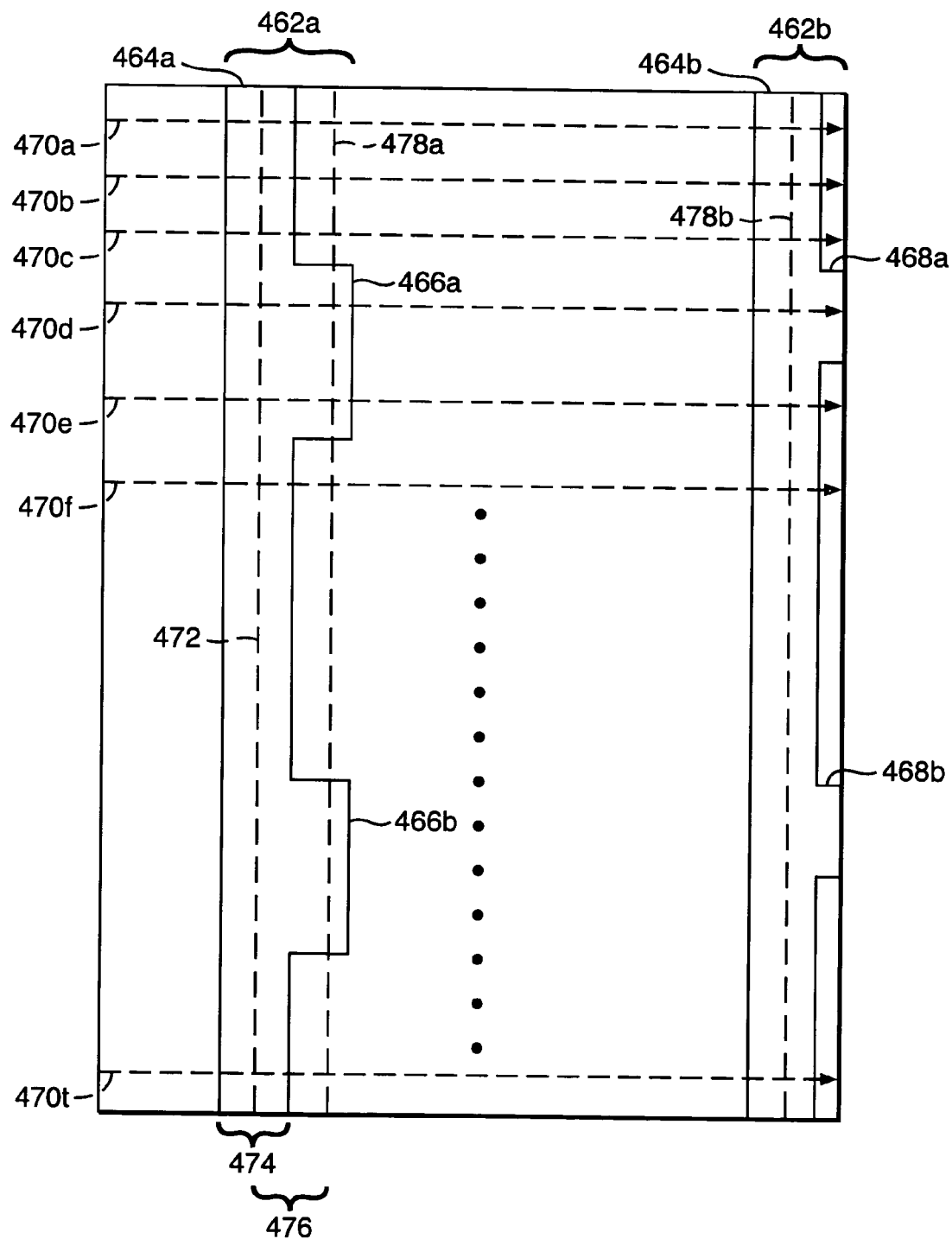
FIG. 4C is a diagram of a cyan color plane of the portion of the printed calibration image shown in FIG. 4A according to one embodiment of the present invention.

For example, referring to FIG. 4C, a diagram is shown illustrating a cyan plane 460 extracted from the region 176 of the printed calibration image portion 400 that is within the field of view 426 shown in FIG. 4A according to one embodiment of the present invention. The cyan plane 460 includes shapes 462*a* and 462*b*, which correspond to the portions of shapes 402*d* and 402*g*, respectively, that are within the field of view 426. The cross-web scans performed in step 508 are illustrated in FIG. 4C by directed lines 470*a–t*. For example, line 470*a* illustrates a single scan that begins on the left-hand side of the plane 460 and scans horizontally to the right. Although twenty scans 470*a–t* are illustrated in FIG. 4C, step 508 may performed any number of scans. In general, the number of scans should be relatively high compared to the number and size of the abutting pixels (e.g., the pixels in pixel groups 466*a–b* and 468*a–b*), so that a significant percentage of the scans capture portions of the lines 464*a–b* that do not include any abutting pixels.

The scans performed in step 508 result in signals 608 that represent the cross-web locations and widths of the shapes 462*a–b* at equally-spaced down-web intervals in each of the RGB planes 604 produced in step 506. An averager 610 averages all of the scan signals 608 in each RGB plane, thereby producing averaged cross-web scan signals 612 for each of the RGB planes (step 510). A normalizer 614 normalizes each of the averaged cross-web scan signals 612 (e.g., to a range of [0, 1]) to produce normalized cross-web scan signals 616 for each of the RGB planes (step 512).

The method 500 uses the normalized cross-web scan signals to identify the edges, thicknesses, and centers of the vertical lines in each of the RGB planes (step 514). Consider, for example, the cyan plane 460 illustrated in FIG. 4C. The normalized average signal produced for the plane 460 will approximate the signal for a single scan (such as scan 470*a*) that passes through the lines 464*a–b* but does not pass through any of the abutting pixels in pixel groups 466*a–b* or 468*a–b*, because the pixel groups 466*a–b* and 468*a–b* occupy a relatively small percentage of the total area of the shapes 462*a–b*. The process of averaging the cross-web scan signals 612 in step 510 will, therefore, largely eliminate the contribution of the pixel groups 466*a–b* and 468*a–b* to the normalized cross-web scan signals 616. The normalized cross-web scan signals 616 may therefore be used as relatively accurate representations of the locations and widths of the pixel lines 464*a–b*.

An edge detector 618 may detect the edges of the vertical lines (such as lines 464*a–b*) in the normalized scan signals 616 using any of a variety of edge-detection algorithms that are well-known to those of ordinary skill in the art, thereby producing RGB cross-web edges 620. A thickness calculator 622 may calculate the cross-web thicknesses (widths) of the lines (e.g., lines 464*a–b*) in the RGB planes based on the edges 620 by calculating the difference in position between pairs of adjacent ones of the edges 620. In particular, if the cross-web coordinates of a pair of adjacent edges is $x_0$ and $x_1$, the width (thickness) of the line having that pair of edges is equal to $x_1-x_0$.

A center calculator 624 may calculate the cross-web coordinates of the centers of the vertical lines in the normalized scan signals 616 based on the edges 620 by calculating the average cross-web coordinates of adjacent pairs of edges. For example, the cross-web center of a line having edges at cross-web coordinates $x_0$ and $x_1$ is equal to $(x_1-x_0)/2$.

The method 500 identifies the distance, in camera pixels, between a pair of adjacent vertical lines in one of the RGB planes (step 516). For example, the method 500 may identify the number of camera pixels separating the center of line 464a from the center of line 464b in cyan plane 460 (FIG. 4C). The method 500 may make this identification because the centers of lines 464a and 464b were identified in step 514.

The method 500 computes the width (e.g., in microns) of a single camera pixel (step 517). The method 500 may perform step 517 by, for example: (1) identifying the distance in microns between a pair of adjacent lines in one of the RGB planes (e.g., cyan lines 464a–b); and (b) dividing this distance by the number of camera pixels separating the centers of the cyan lines 464a–b. The resulting quotient may be used as an estimate of the width of a single camera pixel. The distance in microns between the pair of cyan lines 464a–b may be known with a high degree of accuracy because the number of printer pixels separating the centers of lines 464a–b is known from the ideal calibration image 324 and the width of a single printer pixel is known because the resolution of the cyan print head 116a is known with a high degree of accuracy. The width of a single camera pixel may be used in various calculations performed by subsequent steps of the method 500, as will become apparent from the description below.

An abutting pixel locator 630 uses the line centers 628 and thicknesses 626 identified in step 514 to estimate the horizontal (cross-web) coordinates 632 at which the abutting pixel groups are located in each of the RGB planes (FIG. 5B, step 518). For example, referring again to FIG. 4C, broken line 472 represents the cross-web coordinates of the center of line 464a identified in step 514. The width 474 of the line 464a was also estimated in step 514. In step 518 the method 500 adds to the coordinates 472 an offset 476 that is equal to the width (thickness) 474 of line 464a, thereby producing a cross-web coordinate 478 that represents an estimate of the cross-web center of abutting pixel groups 466a–b. The method 500 may estimate the cross-web centers of the remaining abutting pixel groups in the cyan plane 460 and the magenta and yellow planes in the same manner.

A down-web scanner 634 scans down-web in each of the RGB planes 604 at the cross-web coordinates estimated in step 518, thereby producing vertical RGB scan signals 636 (step 520). For example, the method 500 may scan vertically along lines 478a–b in cyan plane 460. A normalizer 638 normalizes the vertical scan signals 636 produced in step 520 to a range, for example, of [0, 1], thereby producing normalized down-web RGB scan signals 640 (step 522). The method 500 identifies the top and bottom edges, (vertical) lengths, and down-web centers of the abutting pixel groups in the RGB planes (step 524).

Step 524 may, for example, be performed using the same techniques used to perform step 514. For example, an edge detector 642 may detect the down-web edges of the abutting pixel groups in the normalized scan signals 640, thereby producing RGB down-web edges 644. A thickness calculator 646 may calculate the down-web thicknesses (widths) 650 of the abutting pixel groups in the RGB planes based on the edges 644 in the manner described above. A center calculator 648 may calculate the down-web coordinates 652 of the centers of the abutting pixel groups in the normalized scan signals 640 based on the edges 644 in the manner described above.

A cross-web position locator 654 identifies the cross-web position 656 of the captured calibration image 312 relative to the printed calibration image 308, based on the captured calibration image 312 and the ideal calibration image 324 (step 526). For example, referring again to FIG. 4A, the field of view 426 of the camera 172 is offset in the cross-web direction from the left edge of the printed calibration image 308 by some distance. It is important to know the size of this cross-web offset if the printer 302 is a multi-dpi printer, because the expected distance between adjacent lines of differing colors changes as the cross-web coordinates of the lines increases, as a result of the difference in the resolutions of the print heads 116a–c.

Figure 7:
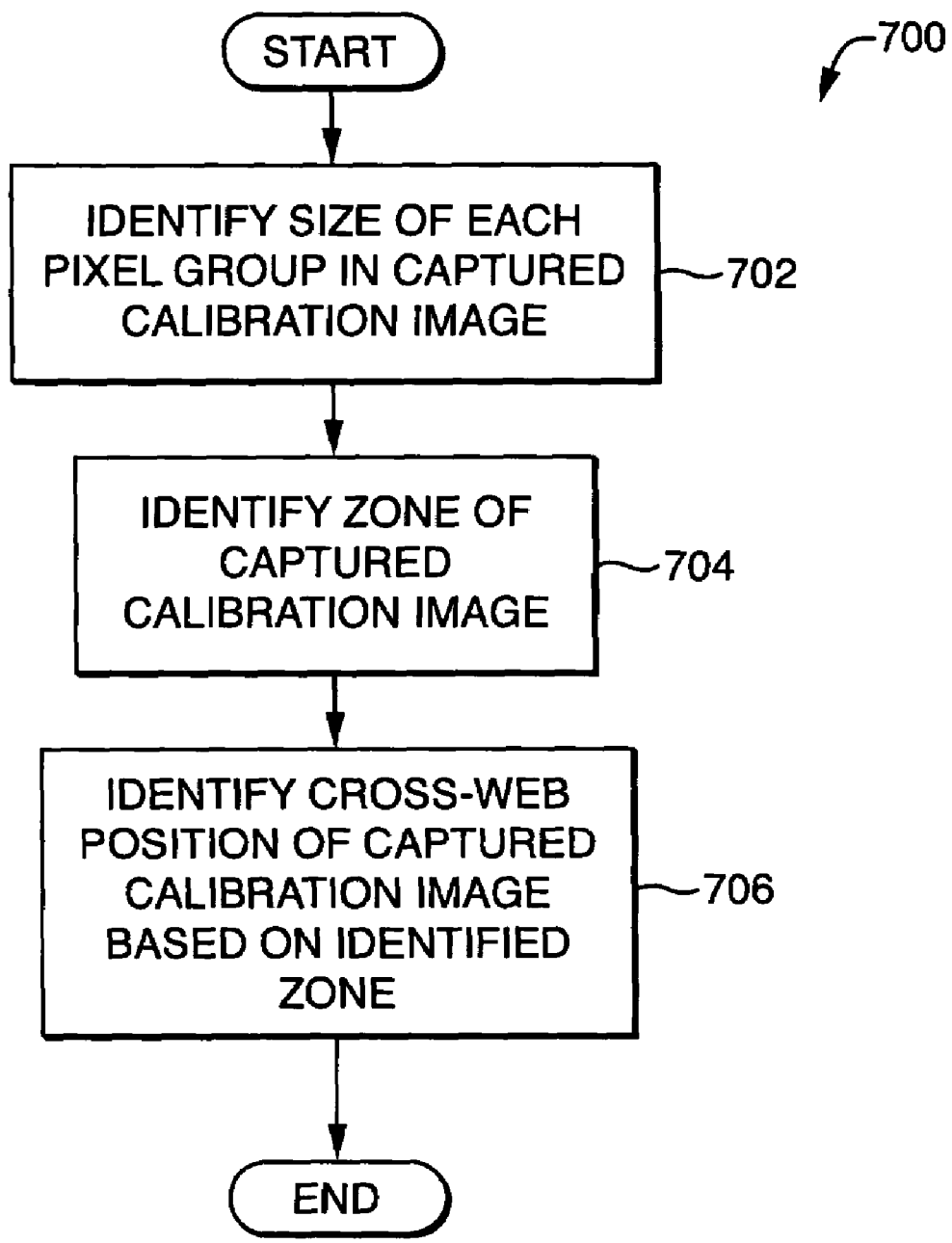
FIG. 7 is a flowchart of a method that is used to identify the cross-web position of a captured calibration image according to one embodiment of the present invention.

Referring to FIG. 7, a flowchart is shown of a method 700 that is used to perform step 526 of method 500 in one embodiment of the present invention. The method 700 determines whether each pixel group in the captured calibration image 312 contains a single pixel or a pair of pixels (step 702). A pixel group containing a single pixel is referred to herein as a "single-pixel group" and a pixel group containing two pixels is referred to herein as a "double-pixel group." For example, in cyan plane 460 (FIG. 4C), each of pixel groups 466a–b contains a pair of cyan pixels, while each of pixel groups 468a–b contains a single cyan pixel. The method 500 may determine whether a particular pixel group contains a single pixel or two pixels by measuring the (down-web) lengths of the pixel groups. Double-pixel groups will be approximately twice as long as single-pixel groups. Double-pixel groups may therefore be distinguished from single-pixel groups by their relative size, whatever their absolute lengths may be.

Referring again to FIG. 4B, the method 500 may determine which of the zones 454a–e fell within the field of view 426 of the image capture device 310, and therefore which zone is within by the captured calibration image 312, using the information obtained thus far (step 704). Recall that each of the zones 454a–e contains a unique pattern of pixel groups. The method 500 may use the colors and sizes of the pixel groups in the RGB planes to identify the zone within which the captured calibration image 312 falls. For example, consider the portion of the captured calibration image that falls within the field of view 426 shown in FIG. 4A. The method 500 may determine that this portion contains both a large (double) cyan pixel group 414b and a small (single) cyan pixel group 420b, and therefore falls within zone 454b.

The method 700 identifies the cross-web coordinate of the left edge of the captured calibration image 312 based on the identified zone (step 706). The method 700 may maintain a lookup table that maps each of the zones 454a–e to the cross-web coordinate of the left edge of the zone. The method 700 may use the lookup table to identify the cross-web coordinate of the left edge of the zone identified in step 704. The left edge of the zone may not, however, be aligned with the left edge of the captured calibration image 312. To estimate the cross-web position of the left edge of the calibration image 312, the method may add a (positive or negative) offset to the cross-web position of the left edge of the zone based on the position of the left edge of the zone within the calibration image 312.

To ensure that the zone of the captured calibration image 312 can be identified, each of the zones 454a–e should be narrower than the width of the field of view 426 of the camera 172, so that at least one full zone is guaranteed to be within the captured calibration image 312.

Referring to FIGS. 5B and 6C, an expected cross-web distance predictor 658 identifies the expected cross-web magenta-yellow and magenta-cyan distances 660 based on the cross-web offset (position) 656 identified in step 526 (step 528). The term "cross-web magenta-yellow distance" refers to the cross-web distance between the first vertical magenta line in the captured calibration image 312 (starting from the left) and the next vertical yellow line looking to the right. For example, in FIG. 4A, the cross-web magenta-yellow distance refers to the cross-web distance between the cross-web center of magenta line 406c and the cross-web center of yellow line 406e. Similarly, the cross-web magenta-cyan distance in FIG. 4A refers to the cross-web distance between the cross-web center of magenta line 406c and the cross-web center of cyan line 406d.

The method 500 may, for example, identify the expected cross-web magenta-cyan and magenta-yellow distances by reference to a pre-generated table that identifies these distances for each of the zones 454a–e. The method 500 may therefore identify these distances by using the zone of the captured calibration image 312 (identified in step 526) as an index into the table. Alternatively, the method 500 may calculate these expected distances using the zone identified in step 526, the ideal calibration image 324, and the known resolutions of the print heads 116a–c.

Figure 8:
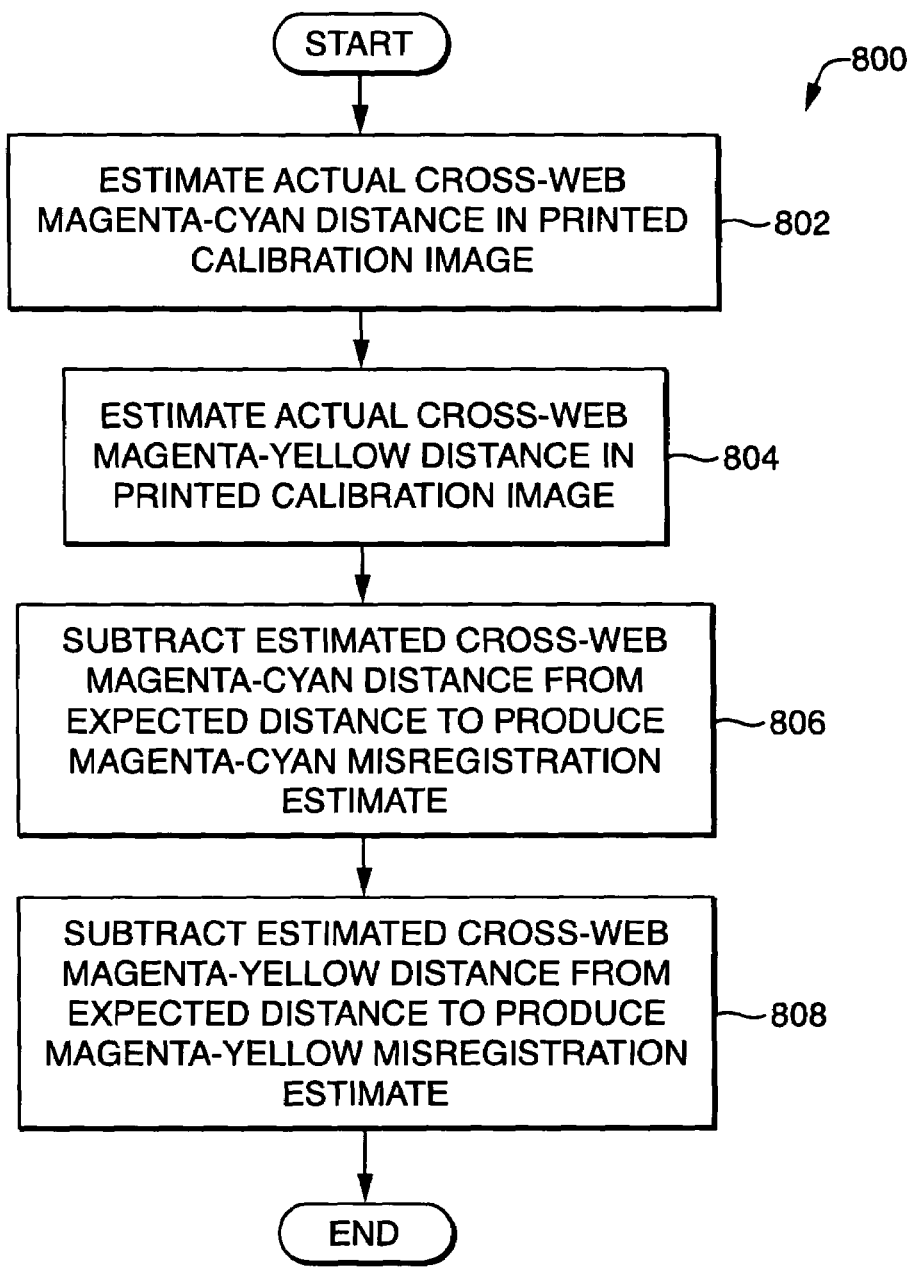
FIG. 8 is a flowchart of a method that is used to estimate cross-web misregistration in a multi-head printer according to one embodiment of the present invention.

A cross-web misregistration estimator 662 generates estimates 654 of the cross-web magenta-cyan and magenta-yellow misregistration based on the expected cross-web distances 660 and the estimated cross-web line centers 628 (step 530). Referring to FIG. 8, a flowchart is shown of a method 800 that is used to perform step 530 according to one embodiment of the present invention. The method 800 estimates the actual cross-web magenta-cyan and magenta-yellow distances in the printed calibration image 308 using the identified cross-web coordinates of the centers of the cyan, magenta, and yellow lines in the captured calibration image 312 (steps 802–804). The method 800 subtracts the estimated cross-web magenta-cyan and magenta-yellow distances from the expected cross-web magenta-cyan and magenta-yellow distances (identified in step 528) to produce cross-web magenta-cyan and magenta-yellow misregistration estimates (step 806–808).

Figure 9:
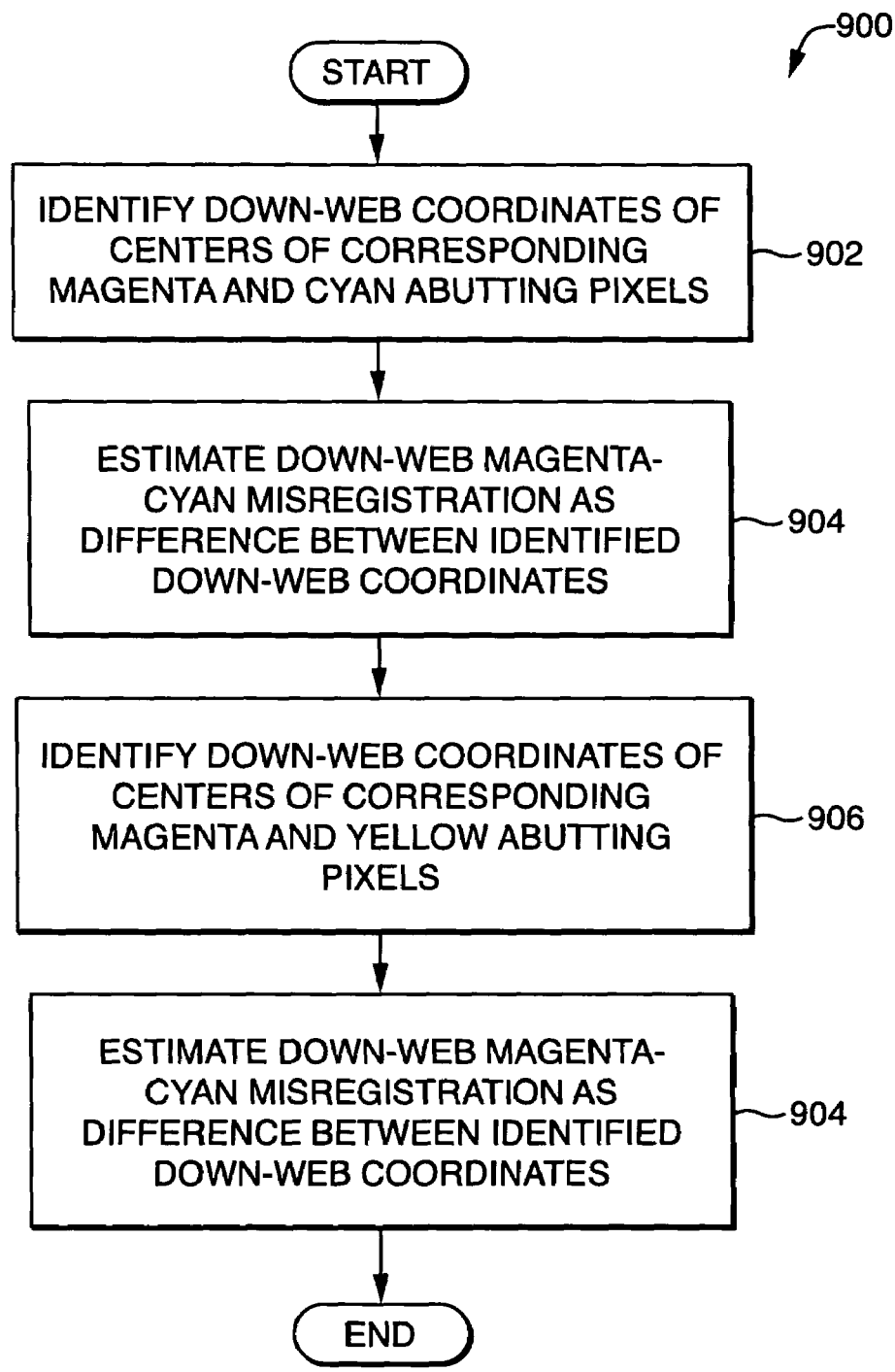
FIG. 9 is a flowchart of a method that is used to estimate down-web misregistration in a multi-head printer according to one embodiment of the present invention.

A down-web misregistration estimator 666 generates estimates 668 of the down-web magenta-cyan and magenta-yellow misregistration based on the estimated down-web centers 652 of the abutting pixel groups (step 532). Referring to FIG. 9, a flowchart is shown of a method 900 that is used to perform step 530 according to one embodiment of the present invention. Before describing operation of the method 900, consider again the calibration image portion 400 shown in FIG. 4A. The particular pattern used in the image portion 400 is designed so that the down-web center of the first (topmost) pixel in each abutting pixel group is in perfect down-web alignment with the centers of the pixels to its left and right (i.e., cross-web in both directions) if the print heads 116a–c are in perfect alignment.

Consider, for example, pixel groups 412b, 414b, and 416b. Magenta pixel group 412b is a single-pixel group, cyan pixel group 414b is a double-pixel group (containing cyan pixels 415a and 415b), and yellow pixel group 416b is a single-pixel group. The "first" pixel in pixel group 414b refers to pixel 415a, which is the topmost pixel in pixel group 414b as it is illustrated in FIG. 4A. The pattern 450 (FIG. 4B) is designed so that the down-web centers of pixels 412b, 415a, and 416b will have the same down-web coordinates if the print heads 116a–c are in perfect down-web registration with each other. The shapes in the pattern 450 may be chosen to have this property by taking into account the resolutions of the print heads 116a–c when selecting the down-web coordinates of the abutting pixel groups in the pattern 450.

The method 900 assumes that the ideal calibration image 324 is designed in the manner just described. The method 900 estimates the actual down-web magenta-cyan misregistration by identifying the down-web coordinates of corresponding magenta and cyan pixels (such as pixels 412b and 415a) (step 902) and calculating the difference between those coordinates (step 904). Similarly, the method 900 estimates the actual down-web magenta-yellow misregistration by identifying the down-web coordinates of corresponding magenta and yellow pixels (such as pixels 412b and 416b) (step 906) and calculating the difference between those coordinates (step 908).

In one embodiment of the present invention, if the cross-web or down-web misregistration estimate exceeds predetermined maximum threshold values, the method 500 either stops operation of the printer 302 or notifies a user of the printer 302 that there is a significant misregistration that may require the printer 302 to be serviced.

Returning to FIG. 5B, the misregistration corrector 318 generates cross-web and down-web registration corrections 320 based on the misregistration estimates 664 and 668 produced in steps 530 and 532 (step 534). The cross-web registration corrections generated in step 534 may, for example, be amounts (in pixels) by which to shift the cyan and/or yellow color planes in a cross-web direction with respect to the magenta color plane when printing images.

For example, if the magenta-cyan cross-web misregistration is estimated to be equal to the width of a single cyan pixel in a positive cross-web direction, the cyan cross-web correction generated in step 534 may be equal to one pixel in a negative cross-web direction. If the magenta-cyan cross-web misregistration is estimated to be less than 0.5 cyan pixels, the cyan cross-web correction may be set equal to zero. More generally, the cyan and yellow cross-web corrections may be rounded to the nearest integral number of pixels.

The down-web registration corrections generated in step 534 may, for example, durations of time by which to delay or advance the output timing of the cyan and yellow print heads 116a and 116c relative to the output timing of the magenta print head 116b. For example, if the magenta-cyan down-web misregistration is estimated to be equal to +30 microns, the output of the cyan print head 116a may be delayed with respect to its previous output timing by the amount of time required for the receiver 110 to advance by 3 microns underneath the cyan print head 116a.

In one embodiment of the present invention, the method 500 maintains minimum cross-web and down-web misregistration thresholds and only generates registration corrections in step 534 if those thresholds are exceeded. Furthermore, the method 500 may generate misregistration corrections based on multiple calibration images rather than based on a single calibration image. For example, cross-web and down-web misregistration estimates may be produced based on a plurality of calibration images and the results averaged. The average cross-web and down-web misregistration estimates may then be used to generate misregistration corrections in step 534.

The method 500 compensates for the estimated cross-web and down-web misregistrations by applying the cross-web and down-web registration corrections generated in step 534 (step 536). The cross-web registration corrections may be applied, for example, by shifting the cyan and yellow color planes of the print data 304 with respect to the magenta color plane by the number of pixels indicated by the cross-web registration corrections generated in step 534. The down-web registrations may be applied, for example, by changing (delaying or advancing) the output timing of the outputs of the cyan print head 116*a* and yellow print head 116*c* with respect to the output timing of the magenta print head 116*b* by the amounts of time indicated by the down-web registration corrections generated in step 534.

Among the advantages of the invention are one or more of the following.

One advantage of the techniques disclosed herein is that they enable color misregistration to be corrected automatically in a "closed-loop" system, i.e., an automated system in which no human intervention is required. Rather, as described above, registration correction may be performed within the printer 302 by printing the calibration image 308, capturing the calibration image using the image capture device 310, analyzing the captured calibration image 312 in software using a computer contained within the printer 302, generating misregistration estimates 316 based on the analysis, and applying registration corrections 320 automatically to images printed subsequently by the printer 302. The ability to perform registration correction automatically in this manner may increase the speed and decrease the cost of registration correction in comparison to systems that require human intervention to perform tasks such as scanning the calibration image 308 or applying the registration corrections 320.

Another advantage of techniques disclosed herein is that they are adapted to perform registration correction in printers having multiple print heads having different resolutions. As described above, such printers complicate the process of performing registration correction because identifying the expected locations of the output produced by multi-dpi print heads requires that the resolution of each print head be taken into account. The techniques disclosed herein may be used to perform registration correction in multi-dpi printers with a high degree of accuracy because such techniques take into account the resolution of each print head. Furthermore, the techniques disclosed herein are not limited to use in conjunction with print heads having the particular resolutions described in the examples above, but rather may be used in conjunction with print heads having any combination of resolutions.

A further advantage of techniques disclosed herein is that they use a single calibration image (target) to perform both down-web and cross-web registration correction. This is advantageous because the time required to print a calibration image typically is significantly longer than the time required to generate and apply the registration corrections 320 necessary to perform registration correction. Therefore, it is advantageous to print only a single calibration image for performing both down-web and cross-web registration correction instead of printing separate images for cross-web and down-web registration correction, because doing so may decrease the time required to perform such registration correction.

Yet another advantages of techniques disclosed herein is that they may be used to perform registration correction even when the magnification and/or field of view location of the image capture device 310 cannot be controlled with a high degree of accuracy. As described above with respect to FIG. 4A, the calibration image 324 may include a pattern that may be used by the printer 302 to ascertain both the actual magnification of the image capture device 310 and the position of the field of view 425 relative to the cross-web origin of the calibration image 312. As a result, registration correction may be performed with a high degree of accuracy even when the magnification and location of the image capture device 310 cannot be controlled with a high degree of accuracy. Furthermore, identifying the magnification and position of the camera 172 by analyzing the captured calibration image 312 in software typically is significantly less costly than using electrical and/or mechanical means to control the magnification and position of the camera 172. The techniques disclosed herein may therefore reduce the overall cost of designing and manufacturing the print mechanism 100 while enabling a high degree of registration precision to be maintained.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The particular print mechanism 100 shown in FIG. 1 is disclosed merely for purposes of example and does not constitute a limitation of the present invention. Other print mechanisms may be used in conjunction with the techniques disclosed herein. For example, the print mechanism 100 may have greater or fewer than four print heads and need not be a thermal transfer printer. The particular resolutions of the print heads 116*a–c* are provided merely for purposes of example. Furthermore, although in the examples described above each of the print heads 116*a–c* has a distinct resolution, this is not a requirement of the present invention. Moreover, although in the examples described above the print mechanism 100 is a multi-color print mechanism, this is not a requirement of the present invention.

The camera 172 is merely one example of an image capture device. Other image capture devices, however, may be used in conjunction with the techniques disclosed herein. Furthermore, the print mechanism 100 may include more than one image capture device. The print mechanism 100 may, for example, include two cameras.

The particular features of the calibration image described in the examples above do not constitute limitations of the present invention. For example, the printed calibration image 312 may be any size. The particular pattern 450 shown in FIG. 4B is shown merely for purposes of example and does not constitute a limitation of the present invention. For example, vertical lines in the calibration image may be wider than one pixel, and abutting pixel groups in the calibration image may be wider than one pixel and longer than two pixels.

Although the pattern 450 illustrated in FIG. 4B is divided into "zones," the use of such zones is not a requirement of the present invention. Rather, cross-web coordinates may be encoded in the pattern 450 in ways that do not make use of distinct zones. Furthermore, even in cases in which zones are used, there may be greater or fewer than five zones having any size or combination of sizes.

Although cross-web and down-web misregistration is measured by reference to magenta in the examples above, this is not a limitation of the present invention. Rather, cross-web and/or down-web misregistration may be measured by reference to any color, combination of colors, or other reference point.

The techniques described above may be implemented, for example, in hardware, software, firmware, or any combination thereof. For example, the methods illustrated in FIGS. 2, 5, 7, 8, and 9 may be implemented in software executing on a processor within the printer 302. Operation of components of the printer 302, including the print mechanism 100, may be controlled in whole or in part by such software.

More generally, the techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use in a tandem printer, the method comprising the steps of:
    (A) receiving a representation of a subset of an image printed by the printer;
    (B) identifying a first pattern in the subset of the image, the first pattern encoding a position of the subset along a first axis of the image, wherein said first axis runs in a cross-web direction of said image and wherein said first pattern comprises a subset of a second pattern having a plurality of unique sub-patterns, wherein said second pattern comprises a plurality of lines running parallel to a second axis of the image and a plurality of shapes abutting the plurality of lines;
    (C) identifying the position of the subset along the first axis of the image based on the first pattern by the steps comprising;
    (C)(1) identifying one of the plurality of unique sub-patterns in the first pattern by matching a pattern of abutting shapes in the subset of the image to a pattern of abutting shapes in the first pattern; and
    (C)(2) identifying the position of of the subset along the first axis based on the sub-pattern identified in step (C)(1); and
    (D) estimating a color misregistration along the first axis of the image based on the position of the subset along the first axis of the image.

2. The method of claim 1, wherein the step (D) comprises steps of:
    (D)(1) identifying an expected distance between a first shape having a first color and a second shape having a second color in the subset of the image based on the position of the subset along the axis of the image;
    (D)(2) estimating an actual distance between the first and second shapes based on the representation of the subset of the image; and
    (D)(3) estimating the color misregistration along the axis of the image as the difference between the expected distance and the estimate of the actual distance between the first and second shapes.

3. The method of claim 1, wherein said printer comprises a first print head for printing at a first resolution and a second print head for printing at a second resolution that differs from the first resolution, wherein the second pattern comprises a plurality of shapes printed by the first and second print heads, and wherein each of the plurality of shapes is printed solely by a single one of the first and second print heads.

4. A computer-implemented method for use in a tandem printer comprising a first print head for printing at a first resolution and a second print head for printing at a second resolution that differs from the first resolution, the method comprising steps of:
    (A) receiving a representation of a subset of an image printed by the printer;
    (B) identifying a first pattern in the subset of the image, the first pattern encoding a position of the subset along a first axis of the image, the first axis running in a cross-web direction of the image, the first pattern comprising a subset of a second pattern having a plurality of zones containing a plurality of unique sub-patterns, wherein said second pattern comprises a plurality of lines running parallel to a second axis of the image and a plurality of shapes abutting the plurality of lines;
    (C) identifying the position of the subset along the first axis of the image based on the first pattern by performing steps of:
    (C)(1) identifying one of the plurality of unique sub-patterns in the first pattern by matching a pattern of abutting shapes in the subset of the image to a pattern of abutting shapes in the first pattern; and (C)(2) identifying the position of the subset along the first axis of the image based on the sub-pattern identified in step (C)(1); and (D) estimating a color misregistration along the first axis of the image based on the position of the subset along the first axis of the image by performing steps of:

(D)(1) identifying an expected distance between a first shape having a first color and a second shape having a second color in the subset of the image based on the position of the subset along the first axis of the image;

(D)(2) estimating an actual distance between the first and second shapes based on the representation of the subset of the image; and (D)(3) estimating the color misregistration along the first axis of the image as the difference between the expected distance and the estimate of the actual distance between the first and second shapes.

5. A printer comprising:

means for receiving a representation of a subset of an image printed by the printer;

first identification means for identifying a first pattern in the subset of the image, the first pattern encoding a position of the subset along a first axis of the image, wherein said first axis runs in a cross-web direction of said image and wherein said first pattern corn rises a subset of a second pattern having a plurality of unique sub-patterns, wherein said second pattern comprises a plurality of lines running parallel to a second axis of the image and a plurality of shapes abutting the plurality of lines;

second identification means for identifying the position of the subset along the axis of the image based on the first pattern, comprising means for identifying one of the plurality of unique sub-patterns in the first pattern by matching a pattern of abutting shapes in the subset of the image to a pattern of abutting shapes in the first pattern; and means for identifying the position of the subset along the first axis based on the subpattern identified; and means for estimating a color misregistration along the first axis of the image based on the position of the subset along the first axis of the image.

6. The printer of claim 5, wherein the means for estimating comprises:

means for identifying an expected distance between a first shape having a first color and a second shape having a second color in the subset of the image based on the position of the subset along the axis of the image;

means for estimating an actual distance between the first and second shapes based on the representation of the subset of the image; and means for estimating the color misregistration along the axis of the image as the difference between the expected distance and the estimate of the actual distance between the first and second shapes.

7. The printer of claim 5, wherein the printer further comprises a first print head for printing at a first resolution and a second print head for printing at a second resolution that differs from the first resolution, wherein the second pattern comprises a plurality of shapes printed by the first and second print heads, and wherein each of the plurality of shapes is printed solely by a single one of the first and second print heads.

8. A data structure tangibly embodied in a computer readable-medium and suitable for printing as a calibration image for use in performing color registration correction in a multi-color printer, the data structure representing an image having a first axis, the image comprising a plurality of regions positioned along the first axis, the plurality of regions comprising a plurality of patterns, each pattern P in the plurality of patterns encoding the position of pattern P along the first axis and comprising a plurality of lines positioned along the first axis and running parallel to a second axis of the image; and a plurality of shapes abutting the plurality of lines.

9. The data structure of claim 8, wherein the printer comprises a plurality of print heads, wherein the plurality of lines have a plurality of colors, and wherein each of the plurality of lines has a single color suitable for printing by a single print head in the printer.

10. The data structure of claim 9, wherein the plurality of lines includes at least one line of each of the colors printable by a single one of the plurality of print heads.

11. The data structure of claim 8, wherein each of the plurality of lines is exactly one pixel wide, and wherein each of the plurality of abutting shapes is exactly one pixel wide.

12. A data structure tangibly embodied in a computer readable-medium and suitable for printing as a calibration image for use in performing color registration correction in a multi-color printer comprising a plurality of print heads, the data structure representing an image having a first axis, the image comprising a plurality of regions positioned along the first axis, the plurality of regions comprising a plurality of patterns, each pattern P in the plurality of patterns encoding the position of pattern P along the first axis, the plurality of patterns comprising: (1) a plurality of lines positioned along the first axis and running parallel to a second axis of the image; and (2) a plurality of shapes abutting the plurality of lines, wherein the plurality of lines have a plurality of colors, and wherein each of the plurality of lines has a single color suitable for printing by a single print head in the printer.

13. A computer-implemented method for use in a printer comprising a first print head for printing at a first resolution and a second print head for printing at a second resolution that differs from the first resolution, the method comprising steps of:

(A) receiving a representation of a subset of an image printed by the printer;

(B) identifying, in the subset of the image, a first shape printed by the first print head;

(C) identifying, in the subset of the image, a second shape printed by the second print head;

(D) estimating locations of the first and second shapes along the first axis of the image based on the representation of the subset of the image; and (E) estimating a color misregistration along the first axis of the image as the difference between the location of the first shape and the location of the second shape along the first axis of the image.

14. The method of claim 13, wherein the printer is a tandem printer and wherein the first axis runs in a down-web direction of the image.

15. The method of claim 13, wherein the step (D) comprises steps of:

(D)(1) identifying a center of the first shape along the first axis;

(D)(2) identifying a center of the second shape along the first axis;

(D)(3) estimating the location of the first shape as the identified center of the first shape; and (D)(4) estimating the location of the second shape as the identified center of the second shape.

16. The method of claim 13, wherein the first shape consists of a first pixel printed by the first print head and wherein the second shape consists of a second pixel printed by the second print head.

17. A computer-implemented method for use in a tandem printer comprising a first print head for printing at a first resolution and a second print head for printing at a second resolution that differs from the first resolution, the method comprising steps of:
  (A) receiving a representation of a subset of an image printed by the printer;
  (B) identifying, in the subset of the image, a first shape printed by the first print head;
  (C) identifying, in the subset of the image, a second shape printed by the second print head;
  (D) estimating locations of the first and second shapes along a first axis of the image based on the representation of the subset of the image, the first axis running in a down-web direction of the printer, by performing steps of:
    (1) identifying a center of the first shape along the first axis;
    (2) identifying a center of the second shape along the first axis;
    (3) estimating the location of the first shape as the identified center of the first shape; and
    (4) estimating the location of the second shape as the identified center of the second shape,
  (E) estimating a color misregistration along the first axis of the image as the difference between the location of the first shape and the location of the second shape along the first axis of the image.

18. A printer comprising:
  a first print head for printing at a first resolution;
  a second print head for printing at a second resolution that differs from the first resolution;
  means for receiving a representation of a subset of an image printed by the printer;
  first identification means for identifying, in the subset of the image, a first shape printed by the first print head;
  second identification means for identifying, in the subset of the image, a second shape printed by the second print head;
  means for estimating locations of the first and second shapes along the first axis of the image based on the representation of the subset of the image; and
  means for estimating a color misregistration along the first axis of the image as the difference between the location of the first shape and the location of the second shape along the first axis of the image.

19. The printer of claim 18, wherein the printer comprises a tandem printer and wherein the first axis runs in a down-web direction of the image.

20. The printer of claim 18, wherein the first identification means comprises:
  means for identifying a center of the first shape along the first axis;
  means for identifying a center of the second shape along the first axis;
  means for estimating the location of the first shape as the identified center of the first shape; and
  means for estimating the location of the second shape as the identified center of the second shape.

21. A computer-implemented method for use in a printer, the method comprising steps of:
  (A) receiving a representation of a subset of an image printed by the printer, the subset of the image comprising a first plurality of shapes printed by the first and second print heads;
  (B) identifying a position of the subset along a first axis of the image;
  (C) identifying an expected distance between a first one of the first plurality of shapes printed by the first print head and a second one of the first plurality of shapes printed by the second print head based on the position of the subset along the first axis of the image;
  (D) estimating an actual distance between the first and second shapes based on the representation of the subset of the image;
  (E) estimating a first color misregistration along the first axis as the difference between the expected distance and the estimated actual distance between the first and second shapes;
  (F) identifying, in the subset of the image, a third shape printed by the first print head;
  (G) identifying, in the subset of the image, a fourth shape printed by the second print head;
  (H) estimating locations of the third and fourth shapes along a second axis of the subset of the image based on the representation of the subset of the image; and
  (I) estimating a second color misregistration along the second axis as the difference between the location of the third shape and the location of the fourth shape along the second axis of the image.

22. The method of claim 21, further comprising a step of:
  (J) prior to the step (A), printing the image.

23. The method of claim 21, further comprising steps of:
  (J) generating a first misregistration correction based on the first color misregistration;
  (K) generating a second misregistration correction based on the second color misregistration; and
  (L) applying the first and second misregistration corrections to a subsequent image printed by the printer.

24. A printer comprising:
  means for receiving a representation of a subset of an image printed by the printer, the subset of the image comprising a first plurality of shapes printed by the first and second print heads;
  means for identifying a position of the subset along a first axis of the image;
  means for identifying an expected distance between a first one of the first plurality of shapes printed by the first print head and a second one of the first plurality of shapes printed by the second print head based on the position of the subset along the first axis of the image;
  means for estimating an actual distance between the first and second shapes based on the representation of the subset of the image:
  means for estimating a first color misregistration along the first axis as the difference between the expected distance and the estimated actual distance between the first and second shapes;
  means for identifying, in the subset of the image, a third shape printed by the first print head;
  means for identifying, in the subset of the image, a fourth shape printed by the second print head;
  means for estimating locations of the third and fourth shapes along a second axis of the subset of the image based on the representation of the subset of the image; and means for estimating a second color misregistration along the second axis as the difference between the location of the third shape and the location of the fourth shape along the second axis of the image.

25. The printer of claim 24, further comprising:

means for generating a first misregistration correction based on the first color misregistration;

means for generating a second misregistration correction based on the second color misregistration; and means for applying the first and second misregistration corrections to a subsequent image printed by the printer.

* * * * *